United States Patent [19]

Guro et al.

[11] Patent Number: 5,073,356
[45] Date of Patent: Dec. 17, 1991

[54] INTEGRATED PROCESSES FOR THE PRODUCTION OF CARBON MONOXIDE

[75] Inventors: David E. Guro, Coopersburg; Ravi Kumar, Allentown; David M. Nicholas, New Tripoli; Gary S. Roth, Trexlertown, all of Pa.

[73] Assignee: Air Products and Chemicals, Inc., Allentown, Pa.

[21] Appl. No.: 586,359

[22] Filed: Sep. 20, 1990

[51] Int. Cl.$^5$ .................... C01B 31/02; C01B 21/26; C01B 3/24; B01J 8/00
[52] U.S. Cl. .................... 423/415 A; 423/247; 423/248; 423/650; 423/652
[58] Field of Search .................... 423/247, 248, 415 A, 423/650, 652

[56] References Cited

U.S. PATENT DOCUMENTS

| | | | |
|---|---|---|---|
| Re. 27,926 | 2/1974 | Roth | 423/247 |
| Re. 31,014 | 8/1882 | Sircar | 55/26 |
| 1,418,246 | 5/1922 | Frazer et al. | 423/247 |
| 3,150,942 | 9/1964 | Vasan | 55/31 |
| 3,380,800 | 4/1968 | Marten | 423/247 |
| 3,564,816 | 2/1971 | Baha | 55/26 |
| 3,699,218 | 10/1972 | Smith et al. | 423/648 |
| 3,789,106 | 1/1974 | Hay | 423/247 |
| 4,019,879 | 4/1977 | Rabo et al. | 55/68 |
| 4,077,779 | 3/1978 | Sircar et al. | 55/25 |
| 4,171,207 | 10/1979 | Sircar | 55/26 |
| 4,470,829 | 9/1984 | Hirai et al. | 55/68 |
| 4,587,114 | 5/1986 | Hirai et al. | 423/247 |
| 4,705,541 | 11/1987 | Sircar | 55/26 |
| 4,713,090 | 12/1987 | Yokoe et al. | 55/68 |
| 4,726,816 | 2/1988 | Fuderer | 55/26 |
| 4,861,351 | 8/1989 | Nicholas et al. | 55/23 |
| 4,869,883 | 9/1989 | Thorogood et al. | 423/247 |
| 4,913,709 | 4/1990 | Kumar | 55/26 |
| 4,914,076 | 4/1990 | Tsuji et al. | 502/477 |
| 4,914,218 | 4/1990 | Kumar et al. | 55/26 |
| 4,915,711 | 4/1990 | Kumar | 55/26 |
| 4,917,711 | 4/1990 | Xie et al. | 55/68 |
| 4,981,676 | 1/1991 | Minet et al. | 423/248 |

FOREIGN PATENT DOCUMENTS 0317235 5/1989 European Pat. Off. .
0367618 5/1990 European Pat. Off. .

Primary Examiner—Gregory A. Heller
Attorney, Agent, or Firm—Geoffrey L. Chase; James C. Simmons; William F. Marsh

[57] ABSTRACT

The present invention is an integrated process for the adsorptive recovery of a high purity carbon monoxide product from a gas mixture containing hydrogen, carbon monoxide, carbon dioxide, methane, and nitrogen, with the potential additional recovery of a hydrogen-rich stream and the recycle of the resulting gas mixture to a reformation reaction to produce the gas mixture with a more favorable carbon monoxide and hydrogen product slate. Separate carbon dioxide recovery can be performed. Hydrogen recovery can be either by adsorptive or by membrane technology. The process achieves high recoveries at reduced capital cost and at reduced product cost.

31 Claims, 12 Drawing Sheets

INTEGRATED PROCESSES FOR THE PRODUCTION OF CARBON MONOXIDE

TECHNICAL FIELD

The present invention is directed to the adsorptive separation of carbon monoxide from synthesis gas additionally containing carbon dioxide and methane wherein hydrogen may also be recovered and a remaining gas recycled to favorably affect synthesis gas production. More specifically, the present invention is directed to the adsorptive separation of bulk quantities of carbon monoxide using a copper loaded adsorbent in processes which also recover hydrogen and carbon dioxide from a synthesis gas.

BACKGROUND OF THE PRIOR ART

Presently methods involving cryogenic distillation techniques are available to purify carbon monoxide or hydrogen and carbon monoxide as separate products. These techniques are relatively energy and capital intensive. Adsorptive processes have not been successfully utilized to purify carbon monoxide or hydrogen and carbon monoxide separately because adsorbents were generally unavailable for separating carbon monoxide from hydrogen and methane containing streams. Carbon dioxide contained in such streams from which carbon monoxide is desired to be resolved also constitutes a technical difficulty for adsorptive type separations. Carbon monoxide is typically produced and recovered from synthesis gases from one of several well understood reforming methods including: steam-methane reforming, auto-thermal reforming, oxygen reforming, dry carbon dioxide reforming, partial oxidation and combinations of the above reformation reactions. Typically, the synthesis gas produced from these reformation reactions contains hydrogen, carbon monoxide, carbon dioxide, methane, water, and possibly nitrogen and argon. This synthesis gas is typically cooled in several heat exchangers to raise steam, preheat reformer feed, preheat boiler feedwater and heat makeup water. The cooled reformer synthesis gas then enters a typical carbon dioxide removal system wherein carbon dioxide is separated from the synthesis gas. The carbon dioxide removal system typically consists of chemical absorption of carbon dioxide into a liquid solvent which is regenerated in a stripping column. This system normally uses a solvent selected from the group consisting of MEA, MDEA, Benfield or other solvent systems well known in the prior art.

In the case of recovery of carbon monoxide alone, the carbon dioxide stripped synthesis gas leaving the carbon dioxide removal system would enter a drier where water and residual carbon dioxide are removed down to ppm levels. The water and carbon dioxide-free synthesis gas from the drier then enters a cryogenic distillation system where pure carbon monoxide is recovered. Also leaving the cryogenic distillation system are two or more streams containing hydrogen, carbon monoxide and/or methane.

In the case of the co-production of both hydrogen and carbon monoxide as separate product streams, the stream leaving the carbon dioxide removal system is similarly cleansed of water and carbon dioxide in a molecular sieve drier bed. Dry, carbon dioxide-free synthesis gas out of the drier is sent to a cryogenic distillation where pure carbon monoxide is recovered. Also leaving the cryogenic distillation is a carbon monoxide-methane stream that is recycled to the feed to the cryogenic distillation, as well as an impure hydrogen stream. The impure hydrogen stream typically contains low amounts (0.5% to 10%) of the carbon monoxide, and it is therefore sent to a hydrogen adsorptive system for hydrogen purification. The hydrogen adsorptive system produces a pure hydrogen stream and a low pressure carbon monoxide and hydrogen stream that is usually used as fuel.

U.S. Pat. No. 4,913,709 discloses an adsorptive process to recover high purity products, such as hydrogen and high purity carbon dioxide, as separate products from a gas mixture containing these components along with minor amounts of methane, carbon monoxide and nitrogen. Typically sodium x-zeolite is used to implement the separation.

U.S. Pat. No. 4,861,351 discloses a method for producing synthesis gas using steam-methane reforming and auto-thermal reforming wherein carbon dioxide in the resulting synthesis gas is removed with a liquid solvent of MEA (monoethanolamine) and the resulting carbon dioxide-lean synthesis gas is further resolved in a pressure swing adsorptive separation system (PSA) using typically 5A zeolite to adsorb carbon monoxide while allowing product hydrogen to pass through unadsorbed, thereby resulting in a carbon monoxide product and hydrogen product.

U.S. Pat. No. 4,171,207 discloses an adsorptive technique for recovering hydrogen unadsorbed from additional components of a gas mixture containing the hydrogen which additional components are adsorbed.

U.S. Pat. No. 4,077,779 discloses another adsorptive separation system for resolving preferably a hydrogen-containing gas mixture into a hydrogen product and a byproduct such as carbon dioxide and/or methane. Relevant adsorbents can be activated, molecular sieve carbons, silica gel, activated alumina or mixtures of these components.

U.S. Pat. No. Re. 31,014 discloses an adsorptive separation of a gas mixture to recover preferably unadsorbed hydrogen as a primary pure product as well as carbon dioxide as a separate byproduct and a waste stream containing methane, carbon monoxide and nitrogen.

U.S. Pat. No. 3,564,816 discloses an adsorptive separation process for recovering hydrogen from adsorbable components consisting of carbon monoxide, carbon dioxide, methane, light saturated or unsaturated hydrocarbons, ammonia, hydrogen sulfide, argon nitrogen and water.

U.S. Pat. No. 4,705,541 discloses an adsorptive process for processing gas mixtures, such as synthesis gas, from a steam-methane reformation reaction wherein separate high purity products of hydrogen and carbon monoxide are produced. The patent references the necessity of removing other synthesis gas components, such as carbon dioxide, before the instigation of the patented process. Typical adsorbents include A, X or Y-zeolites or mordenite with various cation exchange levels, as well as activated carbons, selective for carbon monoxide adsorption.

U.S. Pat. No. 3,150,942 discloses a method for recovering hydrogen from the reformation reaction of natural gas and steam wherein the resulting synthesis gas is subjected to water gas shift to convert carbon monoxide to hydrogen and carbon dioxide and the carbon dioxide is optionally removed by solvent extraction before the synthesis gas is subjected to pressure swing adsorptive separation of non-hydrogen components in 13X and 5A-zeolite sequentially to result in a hydrogen product and a carbon dioxide, water and carbon monoxide by-product.

U.S. Pat. No. 4,914,218 also resolves a gas mixture to two separate products, such as resolving a combination of $H_2$ and $CO_2$ with other gas constituents into separate $H_2$ and $CO_2$ products.

U.S. Pat. No. 4,915,711 discloses a four or five step process for resolving a binary gas mixture into two separate products, such as resolving a combination of $H_2$ and $CO_2$ into separate $H_2$ and $CO_2$ products.

U.S. Pat. No. 3,699,218 discloses a process for recovery of hydrogen from a reformation product gas. Carbon dioxide is removed by methanol solvent, and carbon monoxide is removed by low temperature adsorption on sodium X zeolite. The carbon monoxide content of the reformation product gas is only up to 4.0%.

U.S. Pat. No. 4,726,816 discloses a process in which CO2, CO and H2 are all resolved in the same adsorption bed with the use of a displacement gas to fractionate the recovery of the three separate products during a single cycle of the adsorption bed.

E.P. Patent 0 317 235 discloses a process for recovering CO2, CO and H2 by the use of multiple beds of adsorbent in which CO2 must be adsorbed first. The CO product is extracted from two beds in series and then must be further refined in additional beds which upgrade the CO rich initial product to a high purity product.

E.P. Pat. 0 367 618 discloses a process in which CO2, CO and H2 are all resolved into separate products in the same adsorption bed by the use of multiple steps of desorption or depressurization.

U.S. Pat. No. 4,587,114 discloses a process for removing carbon monoxide from mixed gases using copper salts which are solvent impregnated on a carbon support.

U.S. Pat. No. 4,470,829 discloses an adsorbent for carbon monoxide comprising copper in its monovalent state supported on a carbon base wherein additionally trivalent aluminum is also included in the adsorbent.

U.S. Pat. No. 4,019,879 discloses a zeolitic molecular sieve containing monovalent copper cations which exhibit a high degree of selectivity and affinity for carbon monoxide molecules, wherein carbon monoxide may be separated from gas streams even in the presence of water vapor. Relevant gas streams may comprise carbon monoxide, water vapor, carbon dioxide or nitrogen or alternatively carbon monoxide, carbon dioxide and hydrogen.

U.S. Pat. No. 3,789,106 discloses a method for removal of low levels of carbon monoxide impurity from a gas mixture by utilizing adsorption of the carbon monoxide on mordenite charged with copper. The gas mixture may additionally contain hydrogen, nitrogen, methane, oxygen and rare gases.

U.S. Pat. No. 4,914,076 discloses a carbon monoxide selective adsorbent comprised of copper impregnated on an alumina or silica-alumina substrate. The carbon monoxide selective adsorbent may be utilized on various gas mixtures potentially containing oxygen, methane, hydrocarbons and minor components, such as hydrogen sulfide and ammonia. The recovery of carbon monoxide using the copper containing adsorbent preferably involves initial removal of sulfur compounds, ammonia, water and oxygen, but does not require the removal of carbon dioxide and nitrogen.

U.S. Pat. No. 4,713,090 discloses an adsorbent selective for carbon monoxide adsorption wherein the adsorbent comprises a composite of silica and/or alumina with a layer of activated carbon upon which a copper compound is carried. The adsorbent is useful for recovering carbon monoxide from gas mixtures containing oxygen, methane, hydrocarbons, water and small amounts of hydrogen sulfide and ammonia. Desirably the sulfur, ammonia, water and oxygen removal precede contact of the gas mixture with the copper containing adsorbents for carbon monoxide separation and recovery.

U.S. Pat. No. 4,917,711 discloses an adsorbent for selective adsorption of carbon monoxide from gas mixtures wherein the adsorbent is produced from heating of a solid mixture of a copper compound and a support having a high surface area. The adsorbent is effective for recovering carbon monoxide from a gas mixture, which may include one or more of hydrogen, nitrogen, argon, helium, methane, ethane, propane and carbon dioxide.

The prior art has identified various techniques for recovery of hydrogen individually or hydrogen and carbon dioxide from gas mixtures, as well as the recovery of carbon monoxide. However, the prior art has failed to suggest an integrated process for producing dual products of hydrogen and carbon monoxide from a gas stream containing these components, as well as carbon dioxide and methane in an energy efficient format which enhances the production of carbon monoxide. The present invention as set forth below achieves the energy efficient production of dual products using a series of related unique process integrations.

BRIEF SUMMARY OF THE INVENTION

The present invention is an integrated process for bulk separation of carbon monoxide and the separate recovery of a hydrogen-rich gas from a gas mixture, additionally containing carbon dioxide and methane from a reformation reaction of a hydrocarbon feed stream comprising: reforming a hydrocarbon feed stream in a reformation reaction into a gas mixture containing at least hydrogen, carbon monoxide, carbon dioxide and methane; separately separating carbon monoxide and the hydrogen-rich gas from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture; and recycling at least a portion of the gas mixture as a portion of the feed stream to the reformation reaction after the separations of carbon monoxide and hydrogen rich gas.

Preferably the carbon monoxide is separated from the gas mixture initially and the hydrogen-rich gas is separated from the gas mixture thereafter.

Preferably the hydrogen-rich gas is separated from the gas mixture by selected permeation of the hydrogen-rich gas preferentially through a membrane over the constituents of the gas mixture. Alternatively, the hydrogen-rich gas is separated from the gas mixture by selective adsorption of at least a portion of the non-hydrogen gas constituents preferentially over hydrogen, which is recovered relatively unadsorbed in the separation.

Preferably, the hydrogen-rich gas is a commercially pure hydrogen of at least 95% by volume hydrogen.

Preferably a portion of the recycled gas mixture is combusted as fuel for the reformation reaction.

Alternatively the hydrogen-rich gas is separated from the gas mixture initially and the carbon monoxide is separated from the gas mixture thereafter.

Preferably, the absorbent for bulk separation of carbon monoxide contains copper in a sufficient amount to adsorb bulk quantities of carbon monoxide from the gas mixture. Optimally, the copper containing adsorbent is selective for adsorption of carbon monoxide over carbon dioxide and methane.

Alternatively, carbon dioxide is removed from the gas mixture prior to the removal of carbon monoxide or hydrogen-rich gas by selective adsorption of the carbon dioxide on an adsorbent selective for the adsorption of carbon dioxide over hydrogen and carbon monoxide.

Preferably where carbon dioxide is initially removed from the gas mixture, the gas mixture subsequent to removal of carbon monoxide and hydrogen-rich gas is used to purge carbon dioxide from the adsorbent selective for the adsorption of carbon dioxide before being recycled to the reformation reaction.

More specifically, the preferred embodiment of the present invention is an integrated process for bulk separation of carbon monoxide and the separate recovery of a hydrogen-rich gas from a gas mixture, additionally containing carbon dioxide and methane, from a reformation reaction of a hydrocarbon feed stream, comprising: reforming a hydrocarbon feed stream in a reformation reaction into a gas mixture containing at least hydrogen, carbon monoxide, carbon dioxide and methane; separating carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture; separating a hydrogen-rich gas from the gas mixture by selected permeation of the hydrogen-rich gas preferentially through membrane over the constituents of the gas mixture; and recycling at least a portion of the gas mixture as a portion of the feed stream to the reformation reaction after the separations of carbon monoxide and hydrogen-rich gas.

The present invention in a further preferred embodiment is an integrated process for bulk separation of carbon monoxide and the separate recovery of hydrogen from a gas mixture, additionally containing carbon dioxide and methane, from a reformation reaction of a hydrocarbon feed stream, comprising: reforming a hydrocarbon feed stream in a reformation reaction into a gas mixture containing at least hydrogen, carbon monoxide, carbon dioxide and methane; separating carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture; separating hydrogen from the gas mixture by selective adsorption of the non-hydrogen constituents preferentially over hydrogen, which is recovered relatively unadsorbed in the separation; recycling at least a portion of the gas mixture as a portion of the feed stream to the reformation reaction after the separations of carbon monoxide and hydrogen; and combusting a portion of the recycled mixture as fuel for the reformation reaction.

Yet another preferred embodiment to the present invention is an integrated process for bulk separation of carbon monoxide in the separate recovery a hydrogen-rich gas from a gas mixture, additionally containing carbon dioxide and methane, from a reformation reaction of a hydrocarbon feed stream, comprising: reforming a hydrocarbon feed stream in a reformation reaction into a gas mixture containing at least hydrogen, carbon monoxide, carbon dioxide and methane; separating carbon dioxide from the gas mixture, wherein the carbon dioxide is separated from the gas mixture by selective adsorption of the carbon dioxide on an adsorbent capable of adsorbing carbon dioxide over carbon monoxide and hydrogen from the gas mixture; separating carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture; separating a hydrogen-rich gas from the gas mixture by selective permeation of a hydrogen-rich gas preferentially through a membrane over other constituents of the gas mixture; and recycling at least a portion of the gas mixture as a portion of the feed stream to the reformation reaction after the separations of carbon monoxide and hydrogen-rich gas. Optionally, a portion of the recycling gas mixture can be used to purge the carbon dioxide selective adsorbent.

Finally, another preferred embodiment to the present invention is an integrated process for bulk separation of carbon monoxide and the separate recovery of hydrogen from a gas mixture, additionally containing carbon dioxide and methane, from a reformation reaction of a hydrocarbon feed stream, comprising: reforming a hydrocarbon feed stream in a reformation reaction into a gas mixture containing at least hydrogen, carbon monoxide, carbon dioxide and methane; separating carbon dioxide from the gas mixture, wherein the carbon dioxide is separated from the gas mixture by selective adsorption of the carbon dioxide on an adsorbent capable of adsorbing carbon dioxide over carbon monoxide and hydrogen from the gas mixture; separating carbon monoxide from the gas mixture, wherein the carbon monoxide is separated from the gas mixture in a single stage and a purity of at least 98 volume percent by selective adsorption of carbon monoxide on an adsorbent capable of adsorbing bulk quantities of the carbon monoxide from the gas mixture; separating hydrogen from the gas mixture by selective adsorption of the non-hydrogen constituents preferentially over hydrogen, which is recovered relatively unadsorbed in the separation; purging carbon dioxide from the adsorbent selective for the adsorption of carbon dioxide using the gas mixture after removal of the hydrogen as the purge gas; recycling at least a portion of the purge gas as a portion of the feed stream to the reformation reaction after the separations of carbon monoxide and hydrogen; and combusting a portion of the recycled purged gas as fuel for the reformation reaction.

DETAILED DESCRIPTION OF THE INVENTION

Figure 1:
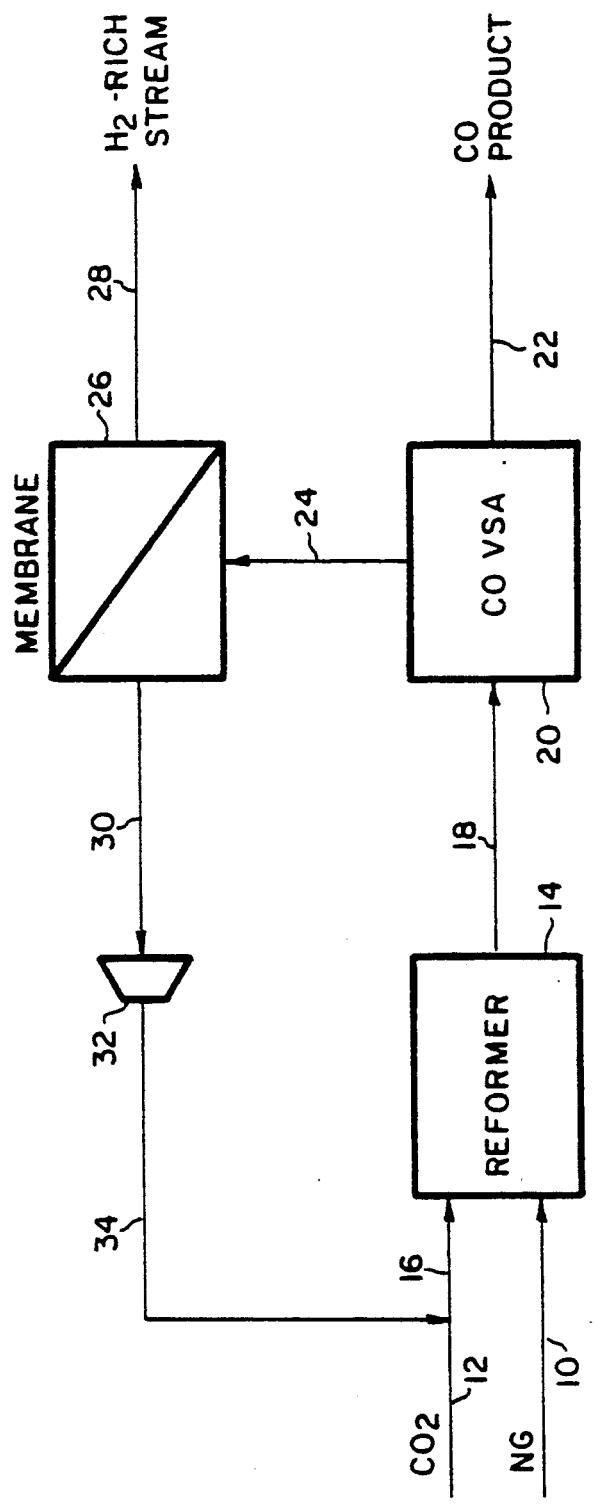
FIG. 1 is a schematic illustration of an integrated process for adsorptive recovery of carbon monoxide followed by recovery of a hydrogen-rich stream by selective permeation through a membrane.

The present invention provides several integrated processes for producing either carbon monoxide alone or co-producing hydrogen and carbon monoxide as separate products more economically than presently utilized commercially available cryogenic distillation processes and with more unique integration of previously separate and disparate adsorption techniques. The integrated processes of the present invention include efficient integration of synthesis gas production steps with carbon monoxide and/or hydrogen adsorptive purification steps. These steps can be performed either with or without prior removal of carbon dioxide. Additionally, carbon dioxide in the processes of the present invention when removed initially is removed in an efficient adsorptive process which is superior to the energy intensive liquid solvent extractions previously practiced commercially. Carbon monoxide is typically produced and recovered from synthesis gases from one of several well understood reforming methods including: steam-methane reforming, auto-thermal reforming, oxygen reforming, dry carbon dioxide reforming, partial oxidation and combinations of the above reformation reactions, which shall hereafter be generally referred to as reforming or reformation reaction.

The integrated processes of the present invention desirably recover carbon monoxide in high purity conditions and in bulk quantities from synthesis gas mixtures which typically contain carbon dioxide and methane. Bulk quantities and high purity are defined for the purpose of this invention as carbon monoxide recoveries of at least 85%, preferably 90+%, and purities of 98%, preferably 99.9%. The industry has previously found it difficult to recovery carbon monoxide when in the presence of these constituents in an energy efficient adsorptive manner. It is important at the present time to be able to produce large quantities of high purity carbon monoxide from sources which contain contaminants, such as carbon dioxide and methane, in order to meet present criteria for high purity urethane precursors for the polymer chemistry industry as well as high clarity for polycarbonate producers utilizing carbon monoxide as a raw material.

The present integrated procedures successfully provide carbon monoxide at the quantities and qualities desired by the present industry requirements, as well as providing a desirable hydrogen byproduct, while recycling a carbon dioxide and methane-rich resulting gas mixture to a reformation reaction wherein the methane is utilized to enhance overall recoveries of feed components, while carbon dioxide effects the reformation reaction to desirably shift product slate to enhanced proportions of the desired carbon monoxide. The carbon monoxide is recovered by selective adsorption in a single stage in the present invention. By use of the term single stage, it is meant that the present invention requires only one contact of the carbon monoxide containing gas mixture with adsorbent selective for carbon monoxide to recover an at least 98 volume percent carbon monoxide product. This is in contrast with prior techniques that required several contacts or stages of one or more adsorbents or systems to obtain the desired purity of carbon monoxide. The present invention's use of a single stage of adsorption is construed to include for instance a plurality of parallel adsorbent beds, but not a series of such beds. The present invention also recovers CO and H2 separately. The use of the phrase separately separating is meant to denote that CO is recovered from the gas mixture in a discreet stage of adsorption specifically for the adsorption of CO, and H2 is recovered in yet another discreet stage of processing of the hydrogen containing gas mixture specifically for the isolation of a hydrogen product. This differs from the prior techniques of using one adsorbent to separate CO2, CO and H2 by incremental desorption and its relatively disadvantageous characteristic of not resolving high purity products from mixtures thereof.

The preferred adsorbents for selectively adsorbing carbon monoxide from synthesis gas mixtures containing hydrogen, carbon monoxide, carbon dioxide, methane with potentially nitrogen and argon impurities are adsorbents containing copper supported on various substrates. Specifically, the copper is preferentially monovalent copper on a silica and/or alumina substrate. Where carbon dioxide has initially been removed before the adsorptive separation of carbon monoxide, the adsorbent can be selected from monovalent copper containing carbon supported adsorbents.

The adsorbents amenable to the separation of hydrogen comprise adsorbents that generally adsorb all other constituents of a gas mixture other than hydrogen, such as 5A and 13X zeolites, activated carbons and mixtures thereof.

Additionally, the membranes which are selectively permeable to hydrogen for use in the present invention comprise include cellulose acetate and polysulfone.

Finally, the adsorbents which are amenable to adsorptive separation of carbon dioxide from synthesis gas mixtures prior to separate recovery of carbon monoxide and hydrogen are those adsorbents comprising among others 5A and 13X zeolites and activated carbons generally used singularly.

Adsorptive techniques for selective recovery of carbon dioxide, carbon monoxide and hydrogen in various purities and various subcombinations and singularly are known in the prior art and such techniques are set forth in U.S. Pat. Nos. 4,913,709, 4,077,779, Re. 31014, 4,857,083, 4,914,218 and 3,564,816 which are incorporated herein by reference in their entirety.

The reformation reactions which produce the synthesis gas mixtures for resolution in the integrated processes of the present invention include the well-known reformation methods of steam-methane reforming, auto-thermal reforming, oxygen reforming, dry carbon dioxide reforming, partial oxidation, or various combinations of sequential treatments using two or more of these methods. Although reformation reactions identified above are the preferred sources of synthesis gas mixtures, it is also possible to treat gas mixtures from various chemical plant off gases and refinery gases.

The present invention will now be set forth in greater detail with reference to various of the embodiments corresponding to the drawings.

In FIG. 1, a preferred embodiment to the present invention is set forth wherein a gas mixture from a reformation reaction is subjected to adsorptive separation of carbon monoxide to produce a high purity carbon monoxide product and the reject gas mixture is further subjected to recovery of a hydrogen-rich stream by contact with a semi-permeable membrane selective to hydrogen over the constituents of the gas mixture and subsequent recycle of the lean gas mixture to the reformation reaction to favorably utilize residual methane and carbon dioxide, to favorably shift the reformation reaction to the production of carbon monoxide by the recycle of carbon dioxide and the recoupment of residual carbon monoxide and hydrogen in the lean gas mixture being recycled. With reference to the drawing, natural gas containing predominantly methane is introduced in line 10 into a reformer 14 along with carbon dioxide in line 12 which may be mixed with recycle gas from line 34 to constitute a combined carbon dioxide gas mixture introduced in line 16. The reformation reaction occurring in stage 14 can be any of the above enumerated reformation reactions or combinations of such reformation reactions with the result that a synthesis gas or gas mixture containing at least hydrogen, carbon monoxide, carbon dioxide, methane, water and possibly nitrogen and argon is produced in line 18. This gas mixture is cooled by appropriate heat exchange equipment which is not shown and then enters a carbon monoxide vacuum swing adsorptive (VSA) stage where carbon monoxide is selectively adsorbed over all the other gas mixture components. The remaining gas mixture passes through the carbon monoxide VSA stage 20 in an unadsorbed relatively high pressure condition in line 24. The adsorbed carbon monoxide is then withdrawn at lower pressure from the carbon monoxide VSA stage 20 to produce a relatively pure carbon monoxide product in line 22. Typically, the pressure of the gas mixture stream entering the carbon monoxide VSA stage is between 15 and 600 psia. The composition of this stream typically ranges as follows: 20-80 vol % hydrogen, 15-70 vol % carbon monoxide, 3-25 vol % carbon dioxide, 0-10 vol % methane, 0-5 vol % nitrogen, and 0-1 vol % argon. An example of a synthesis gas exiting a steam-methane reformer utilizing carbon dioxide import, such as would be representative of one embodiment of the reformation reaction 14, would include on a dry volume percent basis approximately 60% hydrogen, 30% carbon monoxide, 9.65% carbon dioxide, 0.25% methane, 0.10% nitrogen and saturation with water.

The carbon monoxide product withdrawn from the carbon monoxide VSA stage 20 in line 22 would be recovered at approximately 15 psia. It can then typically be compressed to product delivery pressures ranging from 20 to 700 psia. The purity of the carbon monoxide product stream 22 varies depending upon the feed composition and the feed pressure, but a typical carbon monoxide product specification would be in volume percent 99.9% carbon monoxide, less than 100 ppm of hydrogen, less than 100 ppm carbon dioxide, less than 25 ppm of methane and less than 25 ppm nitrogen. The adsorptive separation cycle used in the carbon monoxide VSA stage 20 can be any of a series of pressure or vacuum swing adsorptive separations typically utilizing multiple beds commonly manifolded for sequential operation in known manners of adsorption, depressurization and regeneration, but preferably the carbon monoxide VSA stage 20 would be operated in the manner of U.S. Pat. No. 4,913,709 which is incorporated by reference herein in its entirety. Those beds would constitute a plurality of parallel connected beds of 4 to 5 in number which are operated in the sequence of adsorption, depressurization to remove void space gas and desorb adsorbed gas, purging the bed with a stream of carbon monoxide to displace any non-carbon monoxide codes or components, evacuating the bed to recover a high purity carbon monoxide product and pressurizing the bed with a portion of the gas stream 24 which passes through the carbon monoxide VSA stage 20 unadsorbed. The bed is then regenerated and is ready to accept feed gas mixture in line 18 to continue the cyclic process. In order to maintain continuous processing of the gas mixture and recovery of carbon monoxide product, the various beds are in phased time sequence in their operations so that at any one point in time at least one bed is on adsorption while the other beds are in various stages of depressurization, purge, evacuation and repressurization. The carbon monoxide selective adsorbent is typically selected from adsorbents containing monovalent copper impregnated upon alumina or silica-alumina supports having high surface area and a high dispersion of the monovalent copper on the surface of the support. Such a copper impregnated adsorbent exhibits unique capability to selectively adsorb carbon monoxide out of a gas stream containing carbon dioxide and methane, as well as other constituents denominated above; the selectivity of carbon monoxide over carbon dioxide and methane of such an adsorbent surpasses traditional zeolitic adsorptive characteristics and allows the economic production of a high purity carbon monoxide product satisfactory to high purity end users such as in the urethane precursor industry and the polycarbonate industry.

The carbon monoxide-lean gas mixture in line 24 then enters a hydrogen-rejection membrane stage 26 in which hydrogen permeates through a membrane to the low pressure side of the membrane as permeate in line 28 while the remaining gas mixture passes over the surface of the membrane as the reject stream ultimately removed as line 30. The low pressure hydrogen-rich stream is typically used as a reformer fuel although it may be acceptable as a low purity hydrogen product or useful as another export stream from the process. A preferred membrane that is selective for hydrogen over the remaining constituents of the gas mixture comprising carbon monoxide, carbon dioxide, methane, nitrogen and argon, is polymeric cellulose acetate or polysulfone. The reject gas mixture stream in line 30 can be boosted in pressure in blower-compressor 32 and is recycled in line 34 to the reformation reaction in stage 14 by inclusion with the carbon dioxide import in line 12 for commingling in line 16. It should be noted that, as an alternate, the feed stream to the hydrogen membrane, stream 24, can be compressed to aid the hydrogen separation in the membrane. In such an option, compressor 32 would not be necessary.

The system recovery of carbon monoxide from the embodiment illustrated in FIG. 1 is approximately 99% compared with traditional recoveries in carbon monoxide systems using cryogenics of 91%. Particularly important to the superiority of the present embodiment of the present invention is the fact that the nitrogen content of the carbon monoxide product will be less than 25 ppm, which is in contrast to the nitrogen content of carbon monoxide collected using cryogenics wherein the nitrogen typically concentrates in the carbon monoxide product during such cryogenic processing. The nitrogen content of carbon monoxide recovered using traditional cryogenic techniques will usually be in the range of approximately 0.5% to 10% nitrogen.

In comparison to the other embodiments of the present invention to be discussed below and the prior art commercial practice of cryogenic carbon monoxide recovery, the present preferred embodiment offers desirable low cost for operation and production. Particularly, in comparison to cryogenic processing, the present preferred embodiment exhibits a 23% reduction in capital investment due to the heightened recovery of carbon monoxide of 99% in comparison to 91% recovery using cryogenics, which allows for a smaller reformation reaction stage and heat recovery equipment to produce comparable amounts of carbon monoxide using the present preferred embodiment and utilizing the unique properties of the copper impregnated adsorptive materials in the carbon monoxide VSA stage 20. The traditional MEA liquid solvent carbon dioxide removal system which constitutes a significant capital cost component is eliminated while the need for a carbon dioxide or carbon monoxide recycle compressor is significantly reduced to a single stage blower requirement in comparison to a multi-stage compressor requirement when comparing the present preferred embodiment to the prior art cryogenic carbon monoxide recovery technique. Heightened utilization of power in the preferred embodiment over prior art cryogenic techniques is offset by the above enumerated advantages which results in a total carbon monoxide production cost 9% below traditional cryogenic separation schemes for the production of carbon monoxide. These comparisons are tabulated in Table 1 below.

Figure 2:
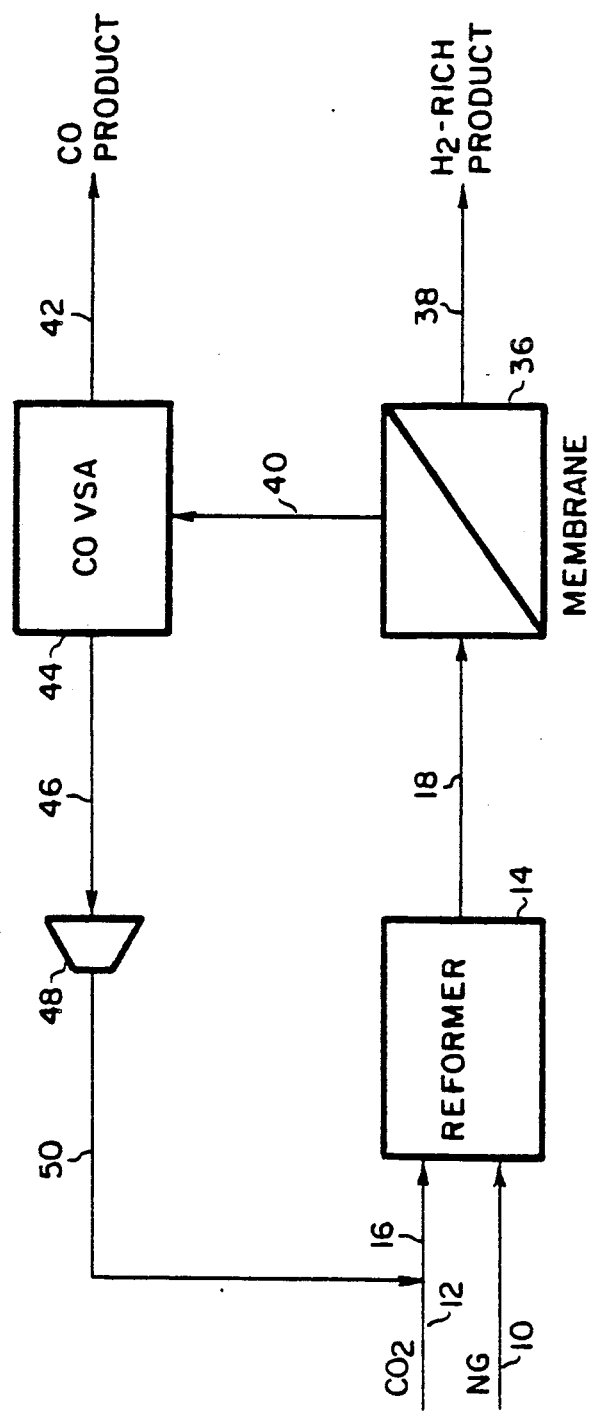
FIG. 2 is a schematic illustration of the recovery of a hydrogen-rich stream by selective permeation through a membrane with recovery of a carbon monoxide product by adsorptive separation from the reject stream from the membrane.

FIG. 2 shows another embodiment of the present invention related to the embodiment of FIG. 1 wherein in the present FIG. 2, the membrane separation of a hydrogen-rich stream comes before the adsorptive separation of a carbon monoxide product. In FIG. 2 similar parts are similarly numbered to FIG. 1 and have corresponding functions. Therefore, the reformer operates in the same context with the same scope of potential embodiments to produce the synthesis gas mixture in line 18 which is then passed over a semi-permeable membrane in the membrane stage 36. The membrane is selective to the permeation of hydrogen to produce a hydrogen-rich stream as permeate in line 38. The reject stream from the membrane stage 36 is removed in line 40 and constitutes the gas mixture less a portion of the hydrogen content. The gas mixture in line 40 is then subjected to adsorptive separation of carbon monoxide wherein the carbon monoxide is preferentially adsorbed on a copper impregnated adsorbent while the remaining components of the gas mixture pass through the carbon monoxide VSA stage 44 relatively unadsorbed as a recycle stream in line 46 for recompression in blower-compressor 48 and recycle in line 50 to achieve heightened recoveries and a favorable shift in the reformation to produce more carbon monoxide than otherwise. During the desorption and/or evacuation stage of the multiple beds of the carbon monoxide VSA stage 44, a high purity carbon monoxide product is removed in line 42. The details of pressure and steps of operation of the carbon monoxide VSA stage 44 and its various streams are similar to the comparable stage described with reference to FIG. 1. However, by the fact that the hydrogen and carbon monoxide separation stages are reversed in this FIG. 2 from FIG. 1, the membrane stage sees a heightened partial pressure of carbon monoxide and therefore more carbon monoxide is lost through the membrane as permeate in the hydrogen-rich stream. Thus recovery of carbon monoxide in this embodiment is approximately 92% compared with the 99% recovery of the first embodiment. However this embodiment still offers an advantage over traditional cryogenic carbon monoxide recovery which is approximately 91%. This embodiment exhibits similar advantages over cryogenic carbon monoxide recovery in effecting a 22% reduction in capital investment for comparable recoveries while overall carbon monoxide product costs in comparison to cryogenic recoveries are reduced by 3%, all of which is tabulated in Table 1 below.

Figure 3:
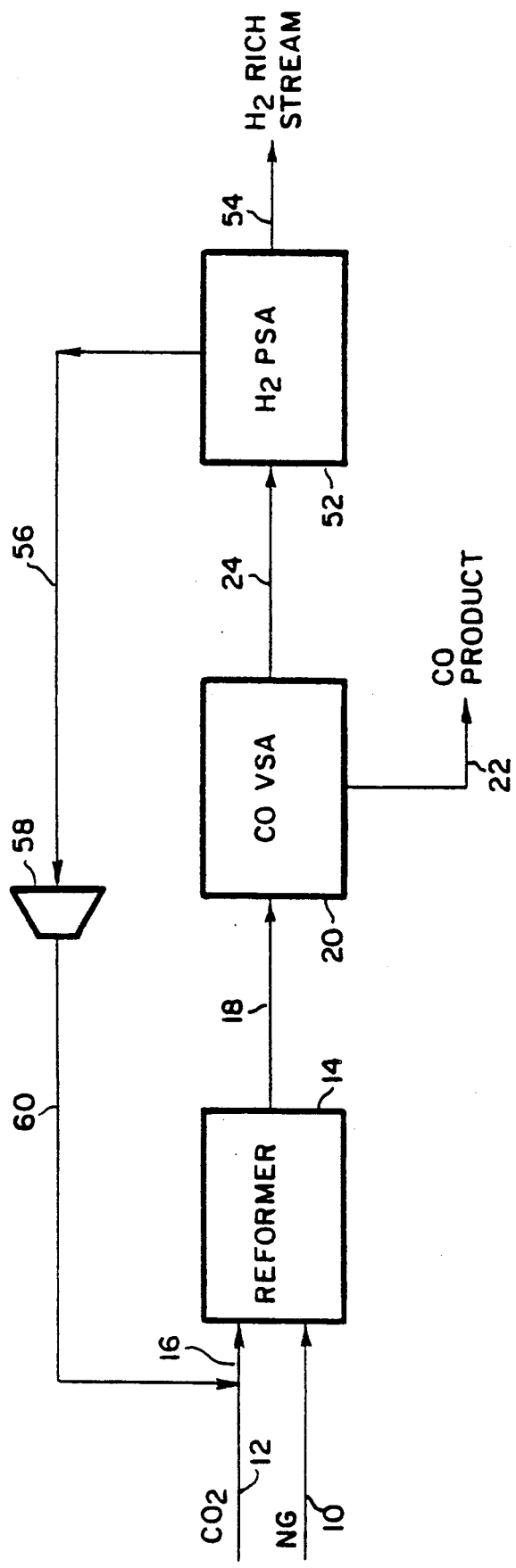
FIG. 3 is a schematic illustration of the adsorptive recovery of a carbon monoxide product with the downstream adsorptive recovery of a hydrogen-rich stream.

The embodiment set forth in FIG. 3 differs from the preferred embodiment of FIG. 1 in that the hydrogen separation is conducted by an adsorptive pressure swing adsorption stage rather than a semi-permeable membrane selected for hydrogen. Similar parts of the drawing are similarly identified and have similar functions such that the reformation and carbon monoxide selection of the process are comparable to FIG. 1. These functions will not be further addressed. However, the gas mixture less a significant portion of the carbon monoxide content in line 24 is removed to a hydrogen pressure swing adsorption stage (PSA) 52 which results in a hydrogen-rich stream 54 at relatively high (near feed stream) pressure which is unadsorbed by the PSA and a rejected gas mixture stream which is adsorbed by the $H_2$-PSA and released during depressurization. This stream is recycled to the reformation reaction 14 in line 56 after being boosted in pressure by blower-compressor 58 and returned in line 60 to the carbon dioxide feed 12.

The operation of the hydrogen PSA stage 52 is conducted in a typical pressure swing adsorption technique with multiple beds connected in parallel with common manifolding in which each bed goes through a sequence of operations to perform continuous processing and gas flow wherein hydrogen passes through the adsorption beds relatively unadsorbed and the remaining components of the gas mixture including carbon dioxide, methane, nitrogen and argon with residual extraneous components are adsorbed selectively on the adsorbent of the PSA for later removal by depressurization. A typical PSA cycle is described in U.S. Pat. No. 3,564,816 which is incorporated by reference herein in its entirety. In that cycle, a group of four or five parallel beds of adsorbent are independently operated in a staged time sequence of adsorption, pressure equalization with a repressurizing parallel bed, co-current depressurization to produce purge for a bed which has finished countercurrent depressurization, further pressure equalization with a repressurizing bed, countercurrent depressurization to reject the adsorbed gas mixture components, purge to remove residual adsorbed gas mixture components using gas from another bed undergoing co-current pressurization and finally repressurization with pressure equalization gas from other of the parallel beds and final repressurization conducted with product from one of the beds presently on adsorption.

Again, the integrated process of this embodiment provides some desirable enhancements in the recovery of a hydrogen-rich stream and a carbon monoxide product. The use of copper impregnated adsorbent to recover carbon monoxide allows carbon dioxide to be in the feed gas mixture in light of the selected adsorption of carbon monoxide over carbon dioxide and also contained methane. Removal of the carbon monoxide in a first stage 20 reduces the loss of carbon monoxide which is possible in the hydrogen-rich stream production stage 52. The recycle of the rejected gas mixture in line 56 after removal of carbon monoxide and the hydrogen-rich stream provides favorable recoveries of products and provides carbon dioxide to the reformation reaction which favorably affects equilibrium reactions in the reformation to produce carbon monoxide predominantly over hydrogen.

Because carbon monoxide is not lost in the hydrogen-rich stream in light of the sequence of stage operations, this embodiment has a carbon monoxide recovery of approximately 99% compared with 91% carbon monoxide recovery for a cryogenic system. Similar advantages of low nitrogen content are also enjoyed by this embodiment. This embodiment has a 20% reduction in capital investment over comparable cryogenic processing for the reasons stated in the description of FIG. 1, but power costs are somewhat higher than cryogenic operation due to the requirements of running the carbon monoxide VSA and the hydrogen PSA units. However, the overall result is carbon monoxide product cost is 7% lower in this embodiment than in traditional cryogenic separations as reported in Table 1 below along with the other enhancements over the prior art.

Figure 4:
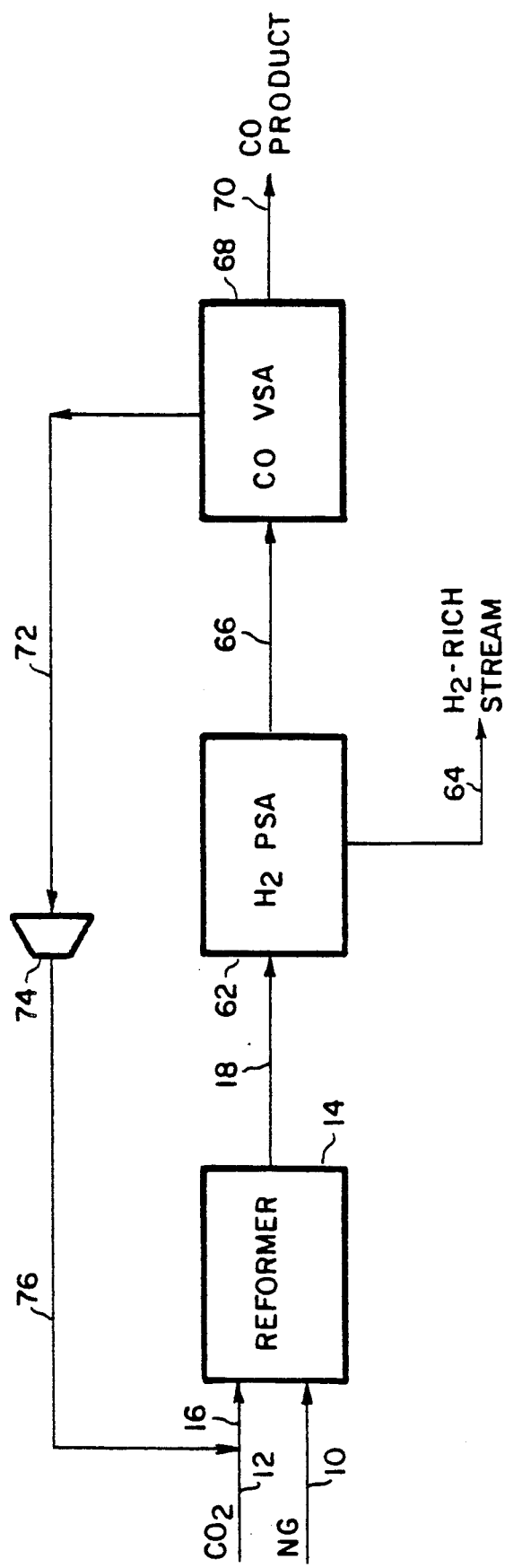
FIG. 4 is a schematic illustration of the adsorptive recovery of a hydrogen-rich stream with the subsequent adsorptive recovery of a carbon monoxide product.

FIG. 4 reverses the sequence of hydrogen-rich product recovery and carbon monoxide product recovery from FIG. 3 while still utilizing pressure swing adsorption and vacuum swing adsorption, respectively. Similar parts to the proceeding drawings are similarly labeled and have corresponding functions and will not be further discussed. Therefore, after reformation of natural gas to create a synthesis gas mixture in line 18, an adsorptive separation of hydrogen using the pressure swing adsorption (PSA), described in FIG. 3, is performed in the hydrogen PSA stage 62 to result in the hydrogen-rich stream 64 removed from the gas mixture relatively unadsorbed by the adsorbent which for both this embodiment and the previous embodiment illustrated in FIG. 3 would be a zeolite, typically 13X or 5A or an activated carbon. Preferably, a combination of such adsorbents would be used. The cycle sequence would be similar to the hydrogen PSA described with regard to FIG. 3, but the potential carbon monoxide impurity in the hydrogen-rich stream would be higher due to the processing of the hydrogen stream prior to the processing of the carbon monoxide stream from the gas mixture. The hydrogen-lean gas mixture in line 66 is then subject to carbon monoxide adsorption selectively over carbon dioxide and methane in the carbon monoxide VSA stage 68 to recover a carbon monoxide product 70. The carbon monoxide VSA stage 68 would be comparable to the VSA adsorptive processes described above with regard to U.S. Pat. No. 4,913,709. The recycled gas mixture less the hydrogen-rich stream and the carbon monoxide product is returned in line 72 and boosted in pressure in blower-compressor 74 before being introduced in line 76 into the carbon dioxide feed in line 12 to the reformation reaction 14.

Because more carbon monoxide is lost in the hydrogen-rich stream, the system recovery of carbon monoxide is approximately 97% compared with the 99% carbon monoxide recovery of the embodiment of FIG. 1. However, the carbon monoxide recovery in this FIG. 4 embodiment is still greater than the approximately 91% recovery obtained by prior art cryogenic techniques. This embodiment also enjoys the lessened nitrogen contamination over cryogenic technology that is described above. This embodiment enjoys a 15% reduction in capital investment over comparable cryogenic carbon monoxide recoveries for the reasons set forth above while experiencing higher utility and power cost for operating two adsorptive separations. However, the result is that carbon monoxide product cost is 4% lower in this embodiment than for traditional cryogenic carbon monoxide separation and recovery. This result is also set forth in Table 1 below with other parameters of the embodiments operating characteristics.

Figure 5:
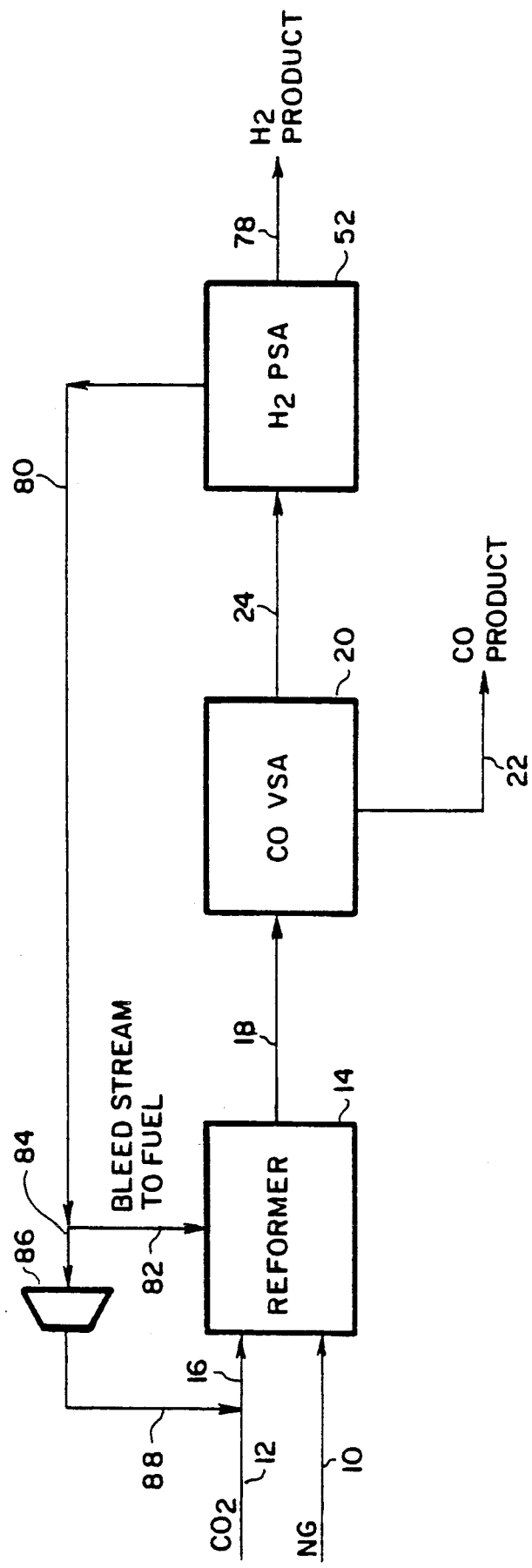
FIG. 5 is a schematic illustration of the adsorptive recovery of a carbon monoxide product with the subsequent recovery of a hydrogen product and recycle of the resulting gas mixture as fuel and feed to a reformation reaction.

The embodiment illustrated in FIG. 5 has the advantage of recovering not only a high purity carbon monoxide product, but also a high purity hydrogen product in contrast to the prior embodiments which recovery only a hydrogen-rich stream. The hydrogen product recovery is in the purity level of 99.5+ volume % in comparison to the hydrogen-rich stream purity levels of 90+ volume % hydrogen. The process sequence of operation is similar to the FIG. 3 embodiment and comparable parts are identified by comparable numbers and have similar functions as described earlier. Those parts will not be further described here. However, the hydrogen PSA stage 52 is run with shorter adsorption phase or larger beds to avoid breakthrough of non-hydrogen components into the hydrogen product. This results in the higher purity hydrogen product stream in line 78 which has a purity of 99.5+ volume % hydrogen. This also results in an adsorbed mixture of components from the gas mixture which are removed by depressurization in line 80 wherein the composition of the gas mixture in line 80 for recycle has a lower hydrogen content than others of the embodiments of the present invention. Because minor components or contaminants are not removed in a hydrogen-rich stream when recovering a high purity hydrogen product stream in this embodiment, it is necessary to send a portion of the recycle gas mixture of line 80 to fuel utilization in line 82 in order to purge the system of undesired build-up of components, such as nitrogen and argon. The remaining recycle gas mixture in line 84 is elevated in pressure in blower-compressor 86 and recycled in line 88 to the carbon dioxide in line 12 going to the reformer stage 14 via line 16.

Since only small amounts of carbon monoxide are lost in the feed stream to fuel in line 82, the system recovery of carbon monoxide in this embodiment is approximately 99% compared with only 91% carbon monoxide recovery in the prior art cryogenic systems. Additionally, since all hydrogen is recovered in the system, except a very minor amount lost to the fuel bleed stream in line 82, the system hydrogen recovery is also about 99% compared with only 85% hydrogen recovery in the typical cryogenic carbon monoxide and hydrogen recovery systems of the prior art.

As set forth in Table 1, this embodiment illustrated in FIG. 5 produces hydrogen product and carbon monoxide product at high purities and at a cost that is the lowest cost of all the embodiments of the present invention that co-produce hydrogen and carbon monoxide. When compared with traditional cryogenic recovery of carbon monoxide and hydrogen, this embodiment of FIG. 5 shows a 32% reduction in capital investment. This embodiment enjoys the same capital cost reductions in various components and sizings as set forth above. Utility costs are somewhat higher than traditional cryogenic processing due to methane lost in the fuel bleed stream and higher utility costs for operating PSA and VSA adsorptive separation units. However, the total hydrogen and carbon monoxide product cost is 10% lower than traditional cryogenic separation streams for the production of hydrogen and carbon monoxide in separate discrete product streams.

Figure 6:
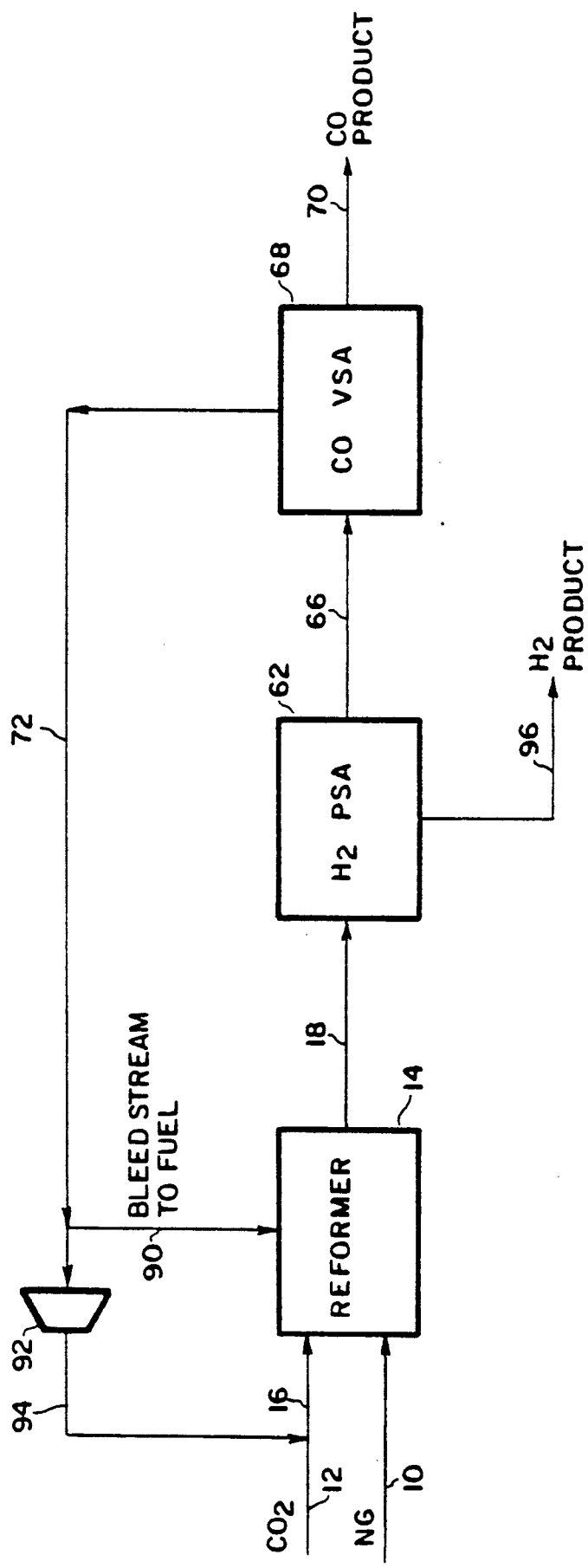
FIG. 6 is a schematic illustration of the adsorptive recovery of a hydrogen product with the subsequent adsorptive recovery of a carbon monoxide product from a gas mixture wherein the resulting gas mixture is recycled as fuel and feed for a reformation reaction.

With regard to FIG. 6, an additional embodiment of an integrated process for the production of both a carbon monoxide product and a hydrogen product are set forth. In comparison to FIG. 5, the embodiment of present FIG. 6 shifts the sequence of removal of the hydrogen product and the carbon monoxide product from the synthesis gas mixture emanating from a reformation reaction. Again, similar parts perform similar functions and are similarly identified by comparable numbers to the preceding embodiments. These parts will not be discussed here. The synthesis gas mixture in line 18 emanating from the reformation reaction enters a hydrogen PSA stage 62 utilizing an adsorptive process, as identified above, comparable to U.S. Pat. No. 3,564,816. A high purity hydrogen product is removed in line 96 from the hydrogen PSA stage 62 as essentially unadsorbed product stream from the gas mixture. The adsorbed components of the gas mixture constituting non-hydrogen components are then removed by depressurization in line 66. This hydrogen-depleted gas mixture is introduced into a carbon monoxide VSA stage 68 which is operated as described above with regard to the first stage of U.S. Pat. No. 4,913,709. The carbon monoxide content of the gas mixture is essentially adsorbed on a copper impregnated adsorbent preferentially over the remaining constituents of the gas mixture comprising residual hydrogen, carbon dioxide, methane and potentially nitrogen and argon. As stated above, during depressurization and evacuation, the carbon monoxide is recovered as a product in line 70 of high purity which can be further pressurized to end use application specifications. The unadsorbed gas mixture passing through the carbon monoxide VSA stage 68 is then recycled at essentially stream pressure in line 72, but a portion of the stream must be bled in line 90 to fuel use in order to avoid build-up of contaminants such as nitrogen and argon in light of the fact that both product streams of hydrogen and carbon monoxide are at high purity and will not provide an outlet for the necessary reduction of contaminants that would otherwise build up in the cyclic process. The recycle of the gas mixture is assisted with a pressure boost in blower-compressor 92 before the elevated pressure gas mixture is finally recycled in line 94 to the incoming carbon dioxide in line 12 going to the reformer reaction 14 through line 16. This integrated process enjoys a 27% reduction in capital investment over presently used cryogenic carbon monoxide separation systems. Recovery of the carbon monoxide is at 99% while the recovery of hydrogen is also approximately 99%. This compares respectively with 91% carbon monoxide recovery for cryogenic systems and 85% hydrogen recovery in those same cryogenic systems. This sizeable differential allows the utilization in the present embodiment of a smaller reformer and heat recovery equipment, the avoidance of an MEA carbon dioxide removal system, but again carries a higher utility requirement due to the loss of methane and carbon dioxide in the fuel bleed stream 90. Power costs for operation of the hydrogen PSA and carbon monoxide VSA also exceed cryogenics. However, despite these higher utilities, the reduction in capital investment allows for a 7% lower total cost for recovery of hydrogen and carbon monoxide separately in the embodiment of FIG. 6 in comparison to traditional cryogenic separations. The comparison of this embodiment with the other embodiments in FIGS. 1-5 as well as the cryogenic prior art separatory technique are set forth in Table 1 below. All these separatory schemes rely on the utilization of a carbon monoxide selective adsorbent which favors the adsorption of carbon monoxide preferentially over carbon dioxide and methane. The preferential selectivity of carbon monoxide over carbon dioxide and methane from a gas mixture containing such components is not typical of most existing commercial adsorbents. Only adsorbents, such as copper impregnated silica and silica-alumina adsorbents, display the unique capacity to selectively adsorb carbon monoxide over carbon dioxide and methane when in the presence of those components in a gas mixture. The unique capability of copper impregnated silica and silica-alumina adsorbents allows for the avoidance of capital intensive and utility consuming liquid solvent carbon dioxide extraction systems which are necessary when trying to remove carbon monoxide from gas mixtures which would otherwise contain carbon dioxide. Therefore, the use of such copper impregnated silica and silica-alumina adsorbents in the context of recovering carbon monoxide from synthesis gas and other reformation reaction effluents provides a unique opportunity to diminish the requirements for expensive carbon dioxide prior removal procedures as well as the freedom to ignore the residual methane content of such synthesis gas mixtures. However, it is also contemplated within the context of the present invention to perform similar hydrogen and carbon monoxide recoveries where carbon dioxide is removed from synthesis gas mixtures prior to recovery of carbon monoxide and/or hydrogen. These will be set forth in the ensuing embodiments.

TABLE 1

Comparison of Adsorptive Options
Adsorbent Selective for CO over CO2

| FIG # | Base-Case Cryogenic | 1 | 2 | 3 | 4 | Base-Case Cryogenic | 5 | 6 |
|---|---|---|---|---|---|---|---|---|
| Product | CO | CO | CO | CO | CO | H2 + CO | H2 + CO | H2 + CO |
| CO Recovery | 91% | 99% | 92% | 99% | 97% | 91% | 99% | 99% |
| H2 Recovery | — | — | — | — | — | 85% | 99% | 99% |
| Installed Investment* | 1.00 | 0.77 | 0.78 | 0.80 | 0.85 | 1.00 | 0.68 | 0.73 |
| Utilities:* | | | | | | | | |
| Natural Gas | 1.00 | 1.02 | 1.06 | 1.02 | 1.02 | 1.00 | 1.43 | 1.43 |
| CO2 | 1.00 | 1.15 | 1.44 | 1.00 | 1.00 | 1.00 | 1.10 | 1.10 |
| Electricity | 1.00 | 1.18 | 1.10 | 1.51 | 1.51 | 1.00 | 1.43 | 1.43 |
| Product Cost* (S/unit product) | 1.00 | 0.91 | 0.97 | 0.93 | 0.96 | 1.00 | 0.90 | 0.93 |

Notes: *Values relative to corresponding cryogenic case.

The next series of embodiments of the present invention for recovery of carbon monoxide from a synthesis gas mixture are directed to processes where carbon dioxide contained in the gas mixture is initially removed prior to the recovery of carbon monoxide and potentially the recovery of hydrogen-rich streams. When carbon dioxide is removed from such gas mixtures prior to the separation of carbon monoxide, different adsorbents may be utilized in the carbon monoxide separation stage. For instance, in the preceding embodiments wherein carbon dioxide was not discretely removed from the gas mixture, the carbon monoxide adsorbent would typically be chosen from cuprous ions dispersed on alumina, silica, silica-alumina and other zeolitic supports. However, when carbon dioxide is not a factor in separating carbon dioxide from such gas mixtures such as in the ensuing embodiments, the adsorbent typically can be chosen from cuprous ion dispersed on activated carbon as well as various traditional zeolites such as 5A and 13X. This latter group of adsorbents is not selective for carbon monoxide over carbon dioxide and therefore their use requires carbon dioxide extraction prior to treatment for the separation of carbon monoxide as is set forth in the following embodiments. In contrast, the former group of adsorbents is selected for carbon monoxide over carbon dioxide, and therefore carbon dioxide does not require prior separation from the gas mixture as is evident from the preceding preferred embodiments reported in Table 1.

Figure 7:
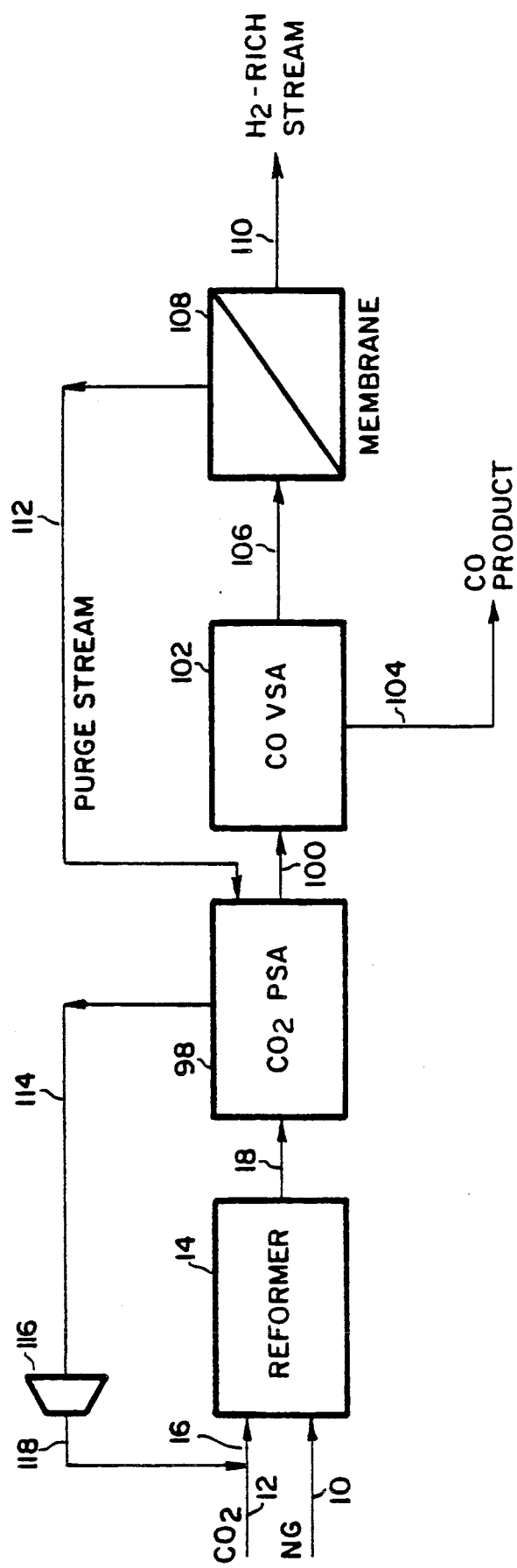
FIG. 7 is a schematic illustration of the rejection of carbon dioxide by adsorptive separation from a synthesis gas with the subsequent adsorptive recovery of carbon monoxide and the recovery of a hydrogen-rich stream by selective permeation through a membrane.

With regard to FIG. 7, a preferred embodiment for the recovery of carbon monoxide as a pure product where carbon dioxide is previously removed from a synthesis gas mixture is set forth. Again, common parts are identified with common numerals as in the former embodiments and perform similar functions. Accordingly, natural gas in line 10 is introduced to a reformation reaction stage 14 along with carbon dioxide in line 12 to produce a synthesis gas mixture in line 18 containing hydrogen, carbon monoxide, carbon dioxide, methane, water and possibly nitrogen and argon. This synthesis gas gas mixture is cooled and then enters a carbon dioxide removal stage where carbon dioxide is nearly completely removed from the gas mixture. The carbon dioxide content of the gas mixture in line 18 is removed in carbon dioxide separation stage 98 which may comprise a PSA or various forms of VSA adsorptive separation removal systems. It should be appreciated that in describing PSA processes for carbon dioxide in the present invention that PSA is intended to include vacuum swing adsorption (VSA) as well as true pressure swing adsorption (PSA). A typical PSA cycle for this carbon dioxide separation is described in U.S. Pat. No. 3,564,816 discussed above. In that cycle, a group of four or five parallel beds of adsorbent are independently operated in a staged time sequence of adsorption, pressure equalization with a repressurizing parallel bed, co-current depressurization to produce purge for a bed which has finished countercurrent depressurization, further pressure equalization with a repressurizing bed, countercurrent depressurization to reject the adsorbed gas mixture components, purge to remove residual adsorbed gas mixture components using gas from another bed undergoing co-current depressurization and finally repressurization with pressure equalization gas from other of the parallel beds and final repressurization conducted with product from one of the beds presently on adsorption. Alternatively, the cycle of U.S. Pat. No. 4,915,711 can be utilized which has a cycle sequence of adsorption, depressurization, evacuation and repressurization, with or without a low pressure purge after the depressurization, in a series of parallel adsorption vessels. This patent is incorporated herein by reference in its entirety. The adsorptive separation of carbon dioxide in carbon dioxide PSA stage 98 is conducted with a plurality of parallel adsorptive beds containing an adsorbent such a cuprous ion dispersed on carbon or 5A or 13X zeolites which selectively adsorb carbon dioxide out of the gas mixture. At or near breakthough of carbon dioxide through any individual bed presently on adsorption, the adsorption is terminated in that bed and switched to one of the plurality of parallel beds of such adsorbent. The bed which has just gone off adsorption is then lowered in pressure to remove void space gas and desorb adsorbed carbon dioxide. At the lowermost pressure of the depressurization stage, a purge gas contained in line 112 comprising the gas mixture, absent carbon dioxide, removed carbon monoxide and removed hydrogen-rich components, passes through the depressurized bed to purge residual carbon dioxide from the bed with the recycle of this purged effluent in line 114 to the reformation reaction stage 14 via blower-compressor 116 and line 118 wherein the purge effluent is blended with the carbon dioxide in line 12 to produce a combined carbon dioxide feed to the reformation reaction stage 14 in line 16. The carbon dioxide adsorbing bed after purge is then repressurized with some of the gas leaving another of the parallel beds presently on adsorption and is ready for a renewed adsorption sequence for extraction of carbon dioxide from feed gas mixture in line 18. Each of the beds of the carbon dioxide PSA stage 98 goes through this sequence of process steps wherein the beds are in staged phases of operation such that one bed is always on adsorption stage while the other beds are in various stages of regeneration so as to result in continuous processing of the gas mixture in line 18.

Alternatively, although not shown, the carbon dioxide adsorptive separation in stage 98 can be run using a vacuum swing adsorption sequence without the use of a purge gas stream wherein after adsorption, each bed in its own sequence is depressurized and then evacuated to a below ambient pressure level to remove void space gas and adsorbed carbon dioxide. This evacuation gas can be separately repressurized and combined with the recycle in line 112 to be introduced with carbon dioxide in line 12 to the reformation reaction stage 14. Such a carbon dioxide selective vacuum swing adsorption process may also utilize the purge stream in line 112 in a manner similar to that described in this FIG. 7 for a pressure swing adsorption removal of carbon dioxide. Conducting removal of carbon dioxide in a vacuum swing adsorption sequence using a purge gas can be practiced in the present invention in a manner described in U.S. Pat. No. 4,857,083, incorporated by reference herein in its entirety, wherein a plurality of parallel adsorbent beds which are commonly manifolded and typically comprising 4-6 such beds is operated in the sequence of adsorption, equalization of the adsorbing bed after the termination of adsorption with another bed having finished the evacuation down to a below ambient pressure to desorb adsorbed carbon dioxide. The bed finishing adsorption and equalization is then depressurized down to ambient pressures and further desorbed of carbon dioxide by evacuation to a subambient pressure level followed by initial repressurization by equalization with a parallel bed just finishing its adsorption stage. Finally, after this second equalization, the regenerating bed is repressurized with product from one of the parallel beds presently undergoing adsorption. An externally supplied purge gas can be utilized in the process after depressurization which purge gas is supplied by the recycling gas mixture rejected from the hydrogen separation by semipermeable membrane. The gas mixture in line 100, absent the carbon dioxide removed in stage 98, is then sent to the carbon monoxide VSA stage 102 for selective extraction of carbon monoxide as a product of the process in line 104. Typically the carbon monoxide product expressed in volume percent would be 99.9% carbon monoxide, less than 100 ppm of hydrogen, less than 1000 ppm of carbon dioxide, less than 25 ppm of methane and less than 25 ppm of nitrogen. Again, the carbon monoxide VSA stage 102 would be operated in the context as described above for U.S. Pat. No. 4,913,709 but with the additional freedom of operating with adsorbents selected from various zeolites such as 5A and 13X as well as the preferred cuprous ion dispersed on an activated carbon. The carbon monoxide lean gas mixture in line 106 is then subjected to passage over a semi-permeable membrane in the membrane stage 108 which membrane is selective for hydrogen over the remaining constituents of the gas mixture. Such membranes were disclosed above with regard to FIGS. 1-6. Hydrogen preferentially permeates through the membrane to produce a hydrogen-rich stream in line 110. This is the permeate of the membrane, while the gas mixture which does not permeate through the membrane in membrane stage 108 is a reject stream which is recycled in line 112 for purge duty or ultimate recycle in line 114, blower-compressor 116 and line 118 to the carbon dioxide feed in line 112 to the reformation reaction stage 14 by comingling in line 16.

The preferred embodiment illustrated in FIG. 7 recovers approximately 99% of the carbon monoxide in the gas mixture which compares very favorably with the 91% carbon monoxide recovery from traditional cryogenic recovery systems. It also enjoys the advantage of low nitrogen content in comparison to cryogenic systems which tend to concentrate nitrogen in carbon monoxide products. The preferred embodiment in FIG. 7 also enjoys a 14% reduction in capital investment over traditional cryogenic carbon monoxide processing technology which results from the use of smaller reformation equipment and smaller heat recovery equipment in light of the enhanced carbon monoxide recovery. In addition, traditional MEA carbon dioxide liquid solvent removal systems are replaced in the preferred embodiment of FIG. 7 with a less expensive adsorptive separation system for carbon dioxide removal. As in the other embodiments described previously, slightly higher utility costs off-set the capital investment advantage but still result in a total carbon monoxide product cost that is 3% below traditional cryogenic separation schemes. This is reported in Table 2 below.

Figure 8:
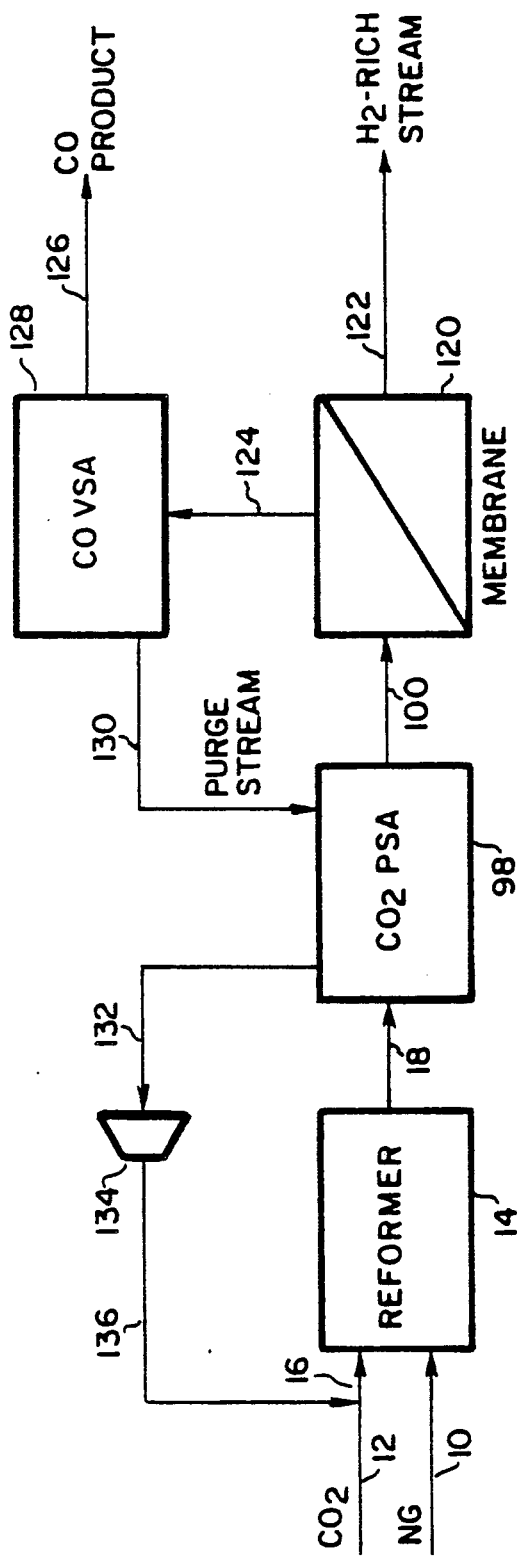
FIG. 8 is a schematic illustration of the rejection of carbon dioxide by adsorptive separation from a gas mixture followed by the recovery of a hydrogen-rich stream by selective permeation through a membrane and recovery by adsorptive separation of carbon monoxide from the reject of the membrane.

FIG. 8 discloses a process embodiment similar to FIG. 7 but wherein the hydrogen-rich membrane separatory stage comes before the carbon monoxide separatory stage in a manner similar to that described with regard to FIG. 2. Again, in the embodiment of FIG. 8 herein, carbon dioxide is extracted separately prior to the recovery of a hydrogen-rich stream or a carbon monoxide product. With regard to the drawing, similar parts are identified with similar numbers and carry similar functions as described in earlier embodiments. These will not be discussed further herein. After reformation of natural gas with carbon dioxide and recycle gas, a gas mixture comprising the resulting synthesis gas is processed to remove carbon dioxide as described above with regard to FIG. 7 and the carbon dioxide-lean gas mixture in line 100 is sent to a membrane separatory stage 120 which has a semi-permeable membrane selected for the permeation of hydrogen as a permeate to recover it as a hydrogen-rich stream 122 from the process. The membranes can be those selected from the group described in earlier embodiments and also produces a reject stream comprising the remaining gas mixture in line 124. This gas mixture is passed to a carbon monoxide VSA stage 128 which is operated in a manner as described for the above embodiments typically using a vacuum swing adsorption cycle as described in the first stage of U.S. Pat. No. 4,913,709, elaborated on above. During evacuation a carbon monoxide product is removed in line 126 having a specification similar to those described for the preceding embodiments. The unadsorbed residual components of the gas mixture pass from the carbon monoxide VSA stage 128 in line 130 for purge duty in carbon dioxide PSA stage 98. The gas in line 130 purges those beds of the PSA stage 98 which are undergoing regeneration and the resulting purge gas passing through such beds is recycled in line 132 with pressure enhancement in blower-compressor 134 for return in line 136 to the carbon dioxide input in line 12 to the reformer reaction stage 14 via common line 16. Since the partial pressure of carbon monoxide in the feed gas mixture in line 100 to the membrane separation stage 120 is higher in this embodiment of FIG. 8 than in the preferred embodiment of FIG. 7, more carbon monoxide is lost through the membrane with the hydrogen-rich stream in line 122. Thus, the recovery of carbon monoxide in this embodiment of FIG. 8 is approximately 92% compared with the 99% carbon monoxide recovery in the preferred embodiment of FIG. 7. However, this embodiment of FIG. 8 still offers an advantage over traditional cryogenic CO recovery systems which have a carbon monoxide recovery of 91%. This embodiment also enjoys the low nitrogen content of less than 25 ppms in comparison to typical nitrogen contents of 0.5% to 10% nitrogen that concentrate in cryogenic carbon monoxide processing. This embodiment of FIG. 8 experiences a 12% reduction in capital investment in comparison to comparable cryogenic processing technology due to smaller reformers and heat recovery equipment as well as replacing MEA carbon dioxide solvent extractions with adsorptive separations of carbon dioxide, though suffering from higher utility costs, to result in an overall improved carbon monoxide product cost 2% lower than traditional cryogenics. This again is reported in Table 2 below.

Figure 9:
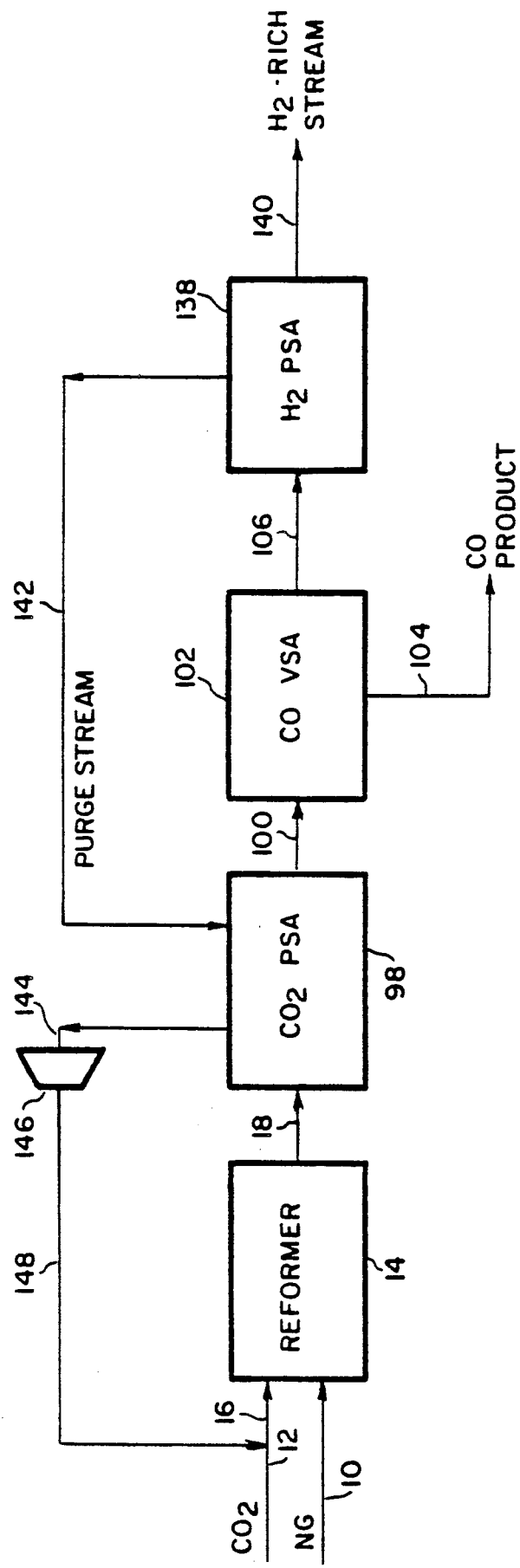
FIG. 9 is a schematic illustration of the rejection of a carbon dioxide stream by adsorptive separation from a gas mixture followed by recovery by adsorptive separation of a carbon monoxide product with subsequent recovery of a hydrogen-rich stream by adsorptive separation.

The embodiment illustrated in FIG. 9 corresponds to the cycle sequence described with regard to FIG. 3, except that as set forth with regard to FIGS. 7 and 8, a carbon dioxide PSA extraction stage 98 is included prior to recovery of carbon monoxide and hydrogen values with the result of enlarging the freedom of choices for the adsorbent to recover carbon monoxide. Similar parts are identified with similar numbers and have similar functions such that the process is essentially the same as FIG. 7 until after carbon dioxide and carbon monoxide are removed in accordance with the description in FIG. 7 and a synthesis gas mixture deleted of those components results in line 106. At that point, the gas mixture is subjected to adsorptive separation for the recovery of a hydrogen-rich stream in the hydrogen PSA stage 138 which is operated as described above with regard to the embodiments having a hydrogen PSA to recover a hydrogen-rich stream and generally as identified with regard to U.S. Pat. No. 3,564,816 detailed above. The hydrogen recovery could also be effected by the second step of U.S. Pat. Nos. 4,913,709 or 4,914,218 both of which are described previously above. The adsorptive stage 138 results in a hydrogen-rich stream in line 140 which constitutes an unadsorbed portion of the gas mixture in line 106. The adsorbed non-hydrogen components of the gas mixture are removed during depressurization and regeneration of the hydrogen PSA stage 138 in line 142. This recycling gas mixture performs purge duty in the beds going off adsorption duty in the carbon dioxide PSA stage 98 and together with the desorbing carbon dioxide recycled in line 144 with pressure enhancement in blower-compressor 146 and ultimate return in line 148 to the carbon dioxide import in line 12 to the reformation reaction stage 14 via common line 16. The carbon dioxide PSA stage 98 can be run in a VSA mode with or without purge utilization as an unillustrated option typically as described with regard to the preferred embodiment in FIG. 7.

The recovery of carbon monoxide in the embodiment of FIG. 9 comprises 99% compared with the cryogenic value of carbon monoxide recovery of 91%. The enhanced recoveries translate into reduced capital investment of 14% but higher utility costs for operation of adsorption units off-sets this somewhat. However, the overall carbon monoxide product costs still achieves a 2% reduction over traditional cryogenic carbon monoxide separation schemes. The economic comparisons of this embodiment are also contrasted with the other embodiments and prior art cryogenics in Table 2 below.

Figure 10:
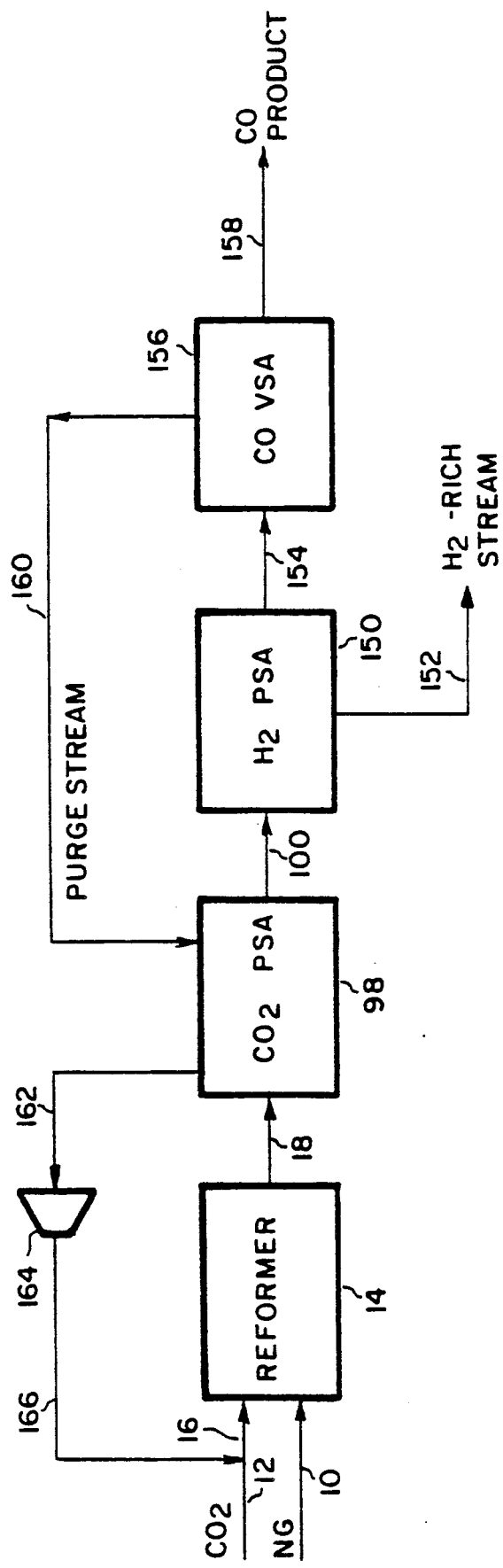
FIG. 10 is a schematic illustration of the rejection of a carbon dioxide component of a gas mixture by adsorptive separation followed by recovery of a hydrogen-rich stream by adsorptive separation and subsequent recovery of carbon monoxide by adsorptive separation from the gas mixture.

The embodiment illustrated in FIG. 10 reverses the sequence of hydrogen recovery and carbon monoxide recovery described in FIG. 9. Again, common parts are identified with common numbers and perform similar functions and therefore are not described again with regard to this embodiment having been described with previous embodiments adequately. The carbon dioxide-lean synthesis gas mixture in line 100 is introduced into a hydrogen PSA stage 150 which operates in accordance with the above embodiment descriptions as was described with regard to U.S. Pat. No. 3,564,816. A non-adsorbed hydrogen-rich stream is recovered in line 152, while the non-hydrogen components of the gas mixture which are adsorbed are released during depressurization and regeneration in line 154. The gas mixture, less the hydrogen-rich components, in line 154 is then subjected to extraction of carbon monoxide in a carbon monoxide VSA stage 156 which is operated in a manner detailed above for such carbon monoxide VSA stages and typically run as described above with regard to the first stage of U.S. Pat. No. 4,913,709. The carbon monoxide adsorbed in this stage 156 is removed during regeneration as the evacuation gas in line 158 as a high purity carbon monoxide product. The unadsorbed components of the gas mixture pass from the carbon monoxide VSA stage 156 in line 160 to perform purge duty in the carbon dioxide VSA stage 98 as described above. The resulting purge effluent in line 162 is pressure enhanced in blower-compressor 164 and returned in line 166 to the carbon dioxide import in line 12 to be fed in line 16 to the reformation reaction stage 14. This embodiment achieves a 97% recovery of carbon monoxide which is lower than several of the previous embodiments due to the loss of carbon monoxide in the initial hydrogen separation, but the 97% recovery is still well above the prior art cryogenic recovery of 91% carbon monoxide. This equates to a 9% reduction on capital investment due to down sizing of equipment as described above with the other embodiments and due to methane lost in the hydrogen stream as well as costs for power operation of the three adsorptive separation units, the overall product cost of carbon monoxide is the same as traditional crogenic processing as further reported in Table 2 below.

Figure 11:
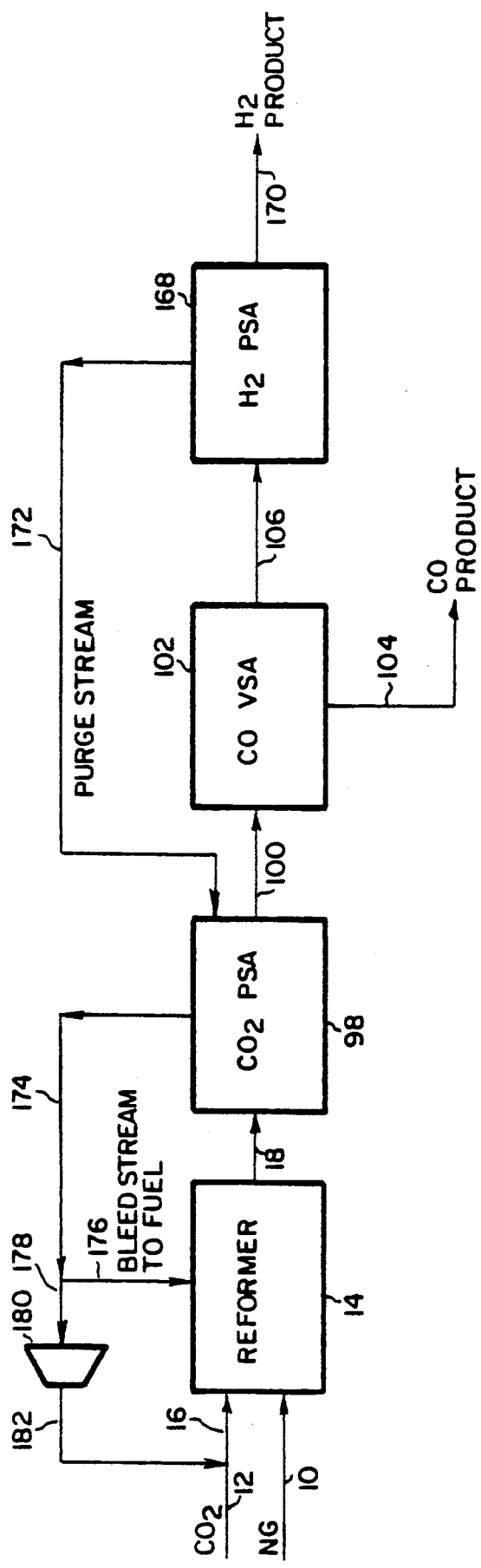
FIG. 11 is a schematic illustration of the rejection of a carbon dioxide component from a gas mixture by adsorptive separation followed by the recovery of a carbon monoxide product by adsorptive separation with subsequent recovery of a hydrogen product by adsorptive separation with recycle of the resulting gas mixture for purge of the carbon dioxide adsorptive stage and subsequent recycle as feed and fuel for a reformation reaction.

FIG. 11 shows a preferred embodiment for the recovery of a carbon monoxide product and a high purity hydrogen product, in contrast to the recovery of hydrogen-rich streams having less than high purity hydrogen in many of the former embodiments. This embodiment also encompasses the prior removal of carbon dioxide before recovery of carbon monoxide and hydrogen. As set forth above, similar parts are similarly identified and perform similar functions and will not be specifically elaborated upon in this embodiment wherein the particular discussion will pick up with the carbon dioxide and carbon monoxide-lean synthesis gas mixture in line 106. This gas mixture in line 106 is introduced into a hydrogen PSA stage 168 operated in the context described with regard to FIG. 5 above wherein an adsorptive sequence is performed in a plurality of parallel beds of adsorbent which each go through stages of adsorption, depressurization and regeneration similar to that described in U.S. Pat. No. 3,564,816. The difference between the recovery of a high purity hydrogen product and a hydrogen-rich stream being that adsorption is conducted for a lesser period of time or through a larger bed such that breakthrough of undesirable components is not permitted. The unadsorbed hydrogen is recovered as a high pressure product stream in line 170 while the non-hydrogen components of the gas mixture are adsorbed in the adsorbent of the PSA stage 168 and are recovered during depressurization for recycle in line 172. This lean gas mixture can be used for purge duty in the carbon dioxide PSA stage 98 as described above and presently laden with carbon dioxide is removed in line 174. Because minor contaminants such as nitrogen and argon are not recovered in a hydrogen-rich stream in this embodiment wherein hydrogen is recovered as a high purity stream, it is necessary in light of the cyclical nature of this embodiment to bleed a certain portion of the stream in line 174 to the reformer reaction stage 14 via line 176. The residual recycle gas mixture in line 178 is elevated in pressure in blower-compressor 180 and recycled in line 182 to the carbon dioxide import in line 12 to be combined in line 16 as a feed to the reformation reaction stage 14.

The product recovery slates for this embodiment are 99% for carbon monoxide and 99% for hydrogen. These compare respectively to 91% carbon monoxide and 85% hydrogen recovery in traditional cryogenic technologies and avoid the concentration of nitrogen in a carbon monoxide product. These high recoveries of the present embodiment result in a 27% reduction in capital investment in comparison to cryogenic prior art technologies because of the downsizing of equipment that can be enjoyed with high recoveries and the switching from a liquid solvent extraction for carbon dioxide to an adsorptive extraction of carbon dioxide. Operation of adsorptive separation stages requires additional power over cryogenics, but despite this penalty the total hydrogen product and carbon monoxide product cost is 6% lower than the hydrogen and carbon monoxide produced in traditional cryogenic technologies. The complete comparison of this embodiment with the prior art is set forth in Table 2 below.

Figure 12:
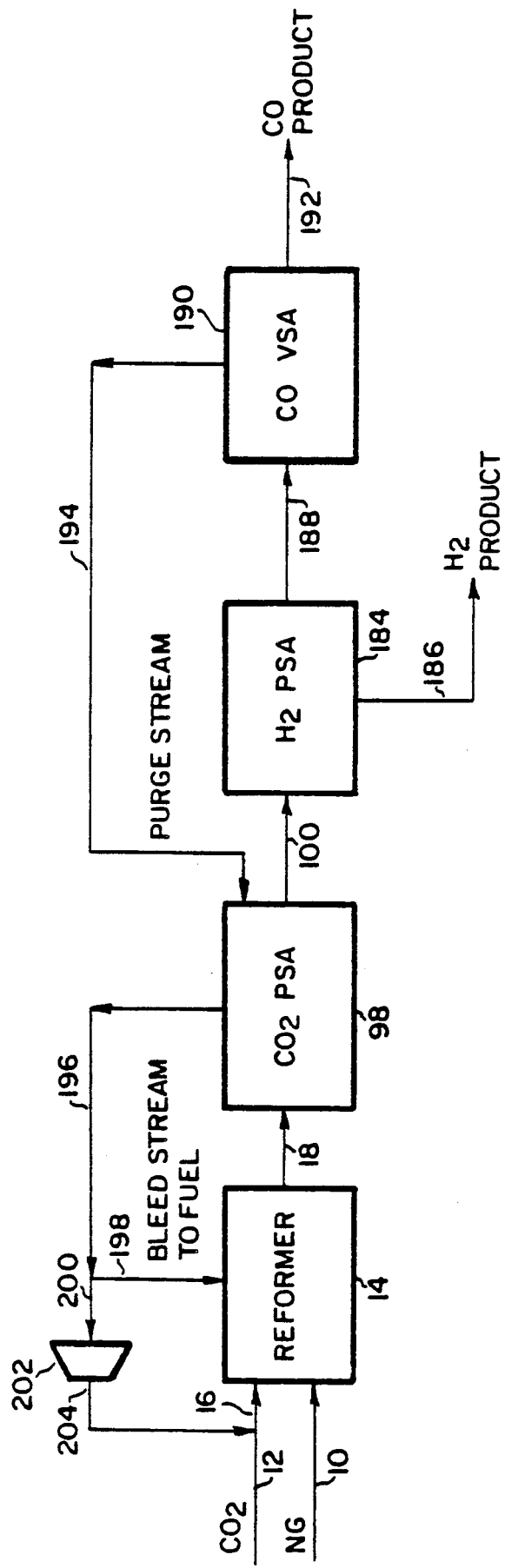
FIG. 12 is a schematic illustration of the rejection of carbon dioxide component from a gas mixture by adsorptive separation followed by recovery of a hydrogen product by adsorptive separation with subsequent recovery of carbon monoxide product by adsorptive separation and recycle of the resulting gas mixture for purge of the carbon dioxide adsorption stage with subsequent recycle as feed and fuel to a reformation reaction.

With reference to FIG. 12, an embodiment is set forth comparable to the embodiment of FIG. 10, but which operates to recover a high purity hydrogen product similar to FIG. 11. In this embodiment, carbon dioxide is extracted first, followed by the recovery of a high purity hydrogen product and subsequently the recovery of a carbon monoxide product. Similar parts are identified by similar numbers and perform a similar function. These will not be reiterated in the discussion of this embodiment. Picking up with the gas mixture after extraction of carbon dioxide out of the other synthesis gas components in line 100, such gas mixture enters hydrogen PSA stage 184 which is operated in an identical manner to the hydrogen PSA stage described in FIG. 11 except that in this instance, carbon monoxide has not been extracted from the feed gas. Unadsorbed hydrogen is recovered in line 186 as a high purity product, while non-hydrogen components are adsorbed and released during depressurization and regeneration as the gas mixture in line 188. The operation of the hydrogen PSA stage 184 is described above and with reference to U.S. Pat. No. 3,564,816 wherein the adsorption stages are conducted to allow only high purity hydrogen to emanate from the various beds, either by shortening the time sequence or enlarging the bed size. The gas mixture in line 188 is then subjected to recovery of carbon monoxide as previously described for such carbon monoxide VSA stages such as stage 190 described with regard to this FIG. 12 and the resulting carbon monoxide product in line 192 is recovered from a system operated similar to U.S. Pat. No. 4,913,709 with regard to its initial stages of parallel adsorptive beds. The remaining components of the gas mixture are recycled in line 194 for potential purge gas duty in the carbon dioxide PSA stage 98 although the options described with regard to FIG. 7 are amenable to this FIG. 12, though not illustrated. The carbon dioxide-loaded recycle gas mixture in line 196 is split to return a portion of the stream for fuel in line 198 in order to avoid build-up of impurities in the cyclic process in light of the fact that the hydrogen PSA stage 184 extracts only a high purity hydrogen product and does not take residual impurities out of the system. The remaining recycle stream in line 200 is increased in pressure in blower-compressor 202 and recycled in line 204 to the carbon dioxide import 12 via line 16 to the reformation reaction stage 14. Recoveries of carbon monoxide and hydrogen separately in this embodiment of FIG. 12 are 99% in comparison, respectively, to 91% carbon monoxide recovery and 85% hydrogen recovery from traditional prior art cryogenic techniques. Build-up of nitrogen in the carbon monoxide product is also avoided in contrast to traditional cryogenic technologies. Similar reductions of capital investment over cryogenic technology of 21% for the embodiment of FIG. 12 are off-set by similar higher utility costs for power operation of the adsorption stages and methane and carbon dioxide lost to fuel. However, the net result is that the combined hydrogen and carbon monoxide separate product costs are reduced 5% over traditional cryogenic technologies for co-production of hydrogen and carbon monoxide as separate products. The results of the overall performance versus cryogenic technology and the other embodiments are also set forth in Table 2 below.

TABLE 2

| | Comparison of Adsorptive Options Adsorbent Not Selective for CO over CO2 | | | | | | | |
|---|---|---|---|---|---|---|---|---|
| FIG # | Base-Case Cryogenic | 7 | 8 | 9 | 10 | Base-Case Cryogenic | 11 | 12 |
| Product | CO | CO | CO | CO | CO | H2 + CO | H2 + CO | H2 + CO |
| CO Recovery | 91% | 99% | 92% | 99% | 97% | 91% | 99% | 99% |
| H2 Recovery | — | — | — | — | — | 85% | 99% | 99% |

TABLE 2-continued

| | Comparison of Adsorptive Options | | | | | | | |
|---|---|---|---|---|---|---|---|---|
| | Adsorbent Not Selective for CO over CO2 | | | | | | | |
| FIG # | Base-Case Cryogenic | 7 | 8 | 9 | 10 | Base-Case Cryogenic | 11 | 12 |
| Installed Investment* | 1.00 | 0.86 | 0.88 | 0.86 | 0.91 | 1.00 | 0.73 | 0.79 |
| Utilities:* | | | | | | | | |
| Natural Gas | 1.00 | 1.02 | 1.06 | 1.02 | 1.02 | 1.00 | 1.43 | 1.43 |
| CO2 | 1.00 | 1.10 | 1.10 | 1.00 | 1.00 | 1.00 | 1.10 | 1.10 |
| Electricity | 1.00 | 1.72 | 1.72 | 1.72 | 1.72 | 1.00 | 1.57 | 1.57 |
| Product Cost* (S/unit product) | 1.00 | 0.97 | 0.99 | 0.98 | 1.00 | 1.00 | 0.94 | 0.95 |

Notes: *Values relative to corresponding cryogenic case.

It should be noted that the above embodiments describe the efficient integration of various gas purification processes with a reformation reaction. It is also possible to use the gas purification techniques described for the purification and production of carbon monoxide or co-production of hydrogen and carbon monoxide from carbon monoxide and hydrogen-containing synthesis gas streams from other sources. Such streams could include chemical plant off-gases, refinery off-gases and similar industrial off-gases. Additionally, the embodiments wherein carbon monoxide is the only pure product recovered could also be used for a proper adjustment of carbon monoxide from synthesis gas streams to provide an appropriate hydrogen to carbon monoxide ratio in a synthesis gas for desired end-use applications.

The various embodiments of the present invention utilize an adsorption carbon monoxide VSA stage using unique adsorbents that can selectively separate pure carbon monoxide product from synthesis gas streams containing methane and hydrogen. Two classes of adsorbents exist which can perform this function, those with selectivity for carbon monoxide over carbon dioxide and those without such selectivity over carbon dioxide. The embodiments of the first six Figures utilize such unique adsorbents having carbon monoxide selectivity over carbon dioxide, methane and hydrogen. Presently known adsorbents which meet these criteria are cuprous ion dispersed adsorbents supported on alumina, silica, silica-alumina and other zeolitic bases. The adsorbents which selectively separate carbon monoxide in non-carbon dioxide-containing streams can typically be cuprous ions dispersed on activated carbon, and various zeolites such as 5A and 13X. The latter adsorbents would be utilized with FIGS. 7-12 wherein the embodiments encompass carbon dioxide initial extraction. The use of these adsorbents in the integrated processes of the present invention result in unexpected reduction in capital and total product costs for producing either carbon monoxide alone or for the co-production of separate hydrogen and carbon monoxide products. Additionally, the efficient usage of recycle streams from these separatory stages in the various embodiments results in higher recovery of carbon monoxide and/or hydrogen and a greater percentage of carbon monoxide in the reformate. Through the use of the new adsorbents, adsorption processes can now be used to produce a high purity carbon monoxide product from synthesis gas, gas mixtures containing methane and/or hydrogen. Additionally, the novel process integrations including optimal use of recycle streams between process unit operations results in higher product recovery of carbon monoxide and/or hydrogen in the existing cryogenic industrially accepted processes. Thus, the present invention describes how to best utilize these new adsorbents in a carbon monoxide VSA process and how best to integrate gas purification steps with the gas synthesis steps within efficient process schemes to produce either carbon monoxide alone or to co-produce hydrogen and carbon monoxide as separate products more economically than is possible today by industrially accepted cryogenic techniques. These processes are gaining increasing importance due to the enlarged use of carbon monoxide in various industries wherein the production of acetic acid requires carbon monoxide having a purity range of 98+ volume %, the isocyanate production industry requires carbon monoxide of 99.9 volume % and the polycarbonate production industry requires carbon monoxide of 99.999 volume %. For the purposes of this invention, carbon monoxide purities of 98+ volume % are considered high purity carbon monoxide streams while carbon monoxide streams having 99.999 volume% carbon monoxide are considered to be ultra-high purity carbon monoxide streams. Similarly, industries have traditionally needed hydrogen streams not only for fuel, but other process reactions wherein typical refinery uses require a hydrogen-rich stream having 90+ volume % hydrogen and typical chemical uses of hydrogen require a hydrogen product stream of 99.5 volume % hydrogen, while the specialty chemical industry requires a hydrogen product stream of 99.999 volume % hydrogen. For the purposes of this invention, hydrogen-rich streams are defined as 90+ volume %, while hydrogen product streams are defined as 99.5 volume % and better.

The present invention has been set forth with various embodiments utilizing carbon monoxide extraction from carbon dioxide-containing streams and carbon dioxide-lean streams, however, the full scope of the present invention should be ascertained from the claims which follow.

We claim:

1. An integrated process for bulk separation and recovery of carbon monoxide and the separate separation and recovery of a hydrogen-rich gas from a gas mixture, additionally containing carbon dioxide, methane and nitrogen, from a reformation reaction of a hydrocarbon feed stream, comprising:
   (a) reforming a hydrocarbon feed stream in a reformation reaction into a gas mixture containing at least hydrogen, carbon monoxide, carbon dioxide, methane and nitrogen;
   (b) separately separating and recovering carbon monoxide and a hydrogen-rich gas from the gas mixture, wherein the carbon monoxide is separated from the gas mixture in a single stage and a purity of at least 98 volume percent by selective adsorption of the carbon monoxide on a copper containing adsorbent capable of adsorbing bulk quantities of the carbon monoxide from the gas mixture; and (c) recycling at least a portion of the gas mixture as a portion of the feed stream to the reformation reaction after the separations of carbon monoxide and hydrogen-rich gas.

2. The process of claim 1 wherein carbon monoxide is separated from the gas mixture initially and the hydrogen-rich gas is separated from the gas mixture thereafter.

3. The process of claim 2 wherein the hydrogen-rich gas is separated from the gas mixture by selective permeation of the hydrogen-rich gas through a membrane preferentially over the other constituents of the gas mixture.

4. The process of claim 2 wherein the hydrogen-rich gas is separated from the gas mixture by selective adsorption of at least a portion of the non-hydrogen gas constituents preferentially over hydrogen, which is recovered relatively unadsorbed in the separation.

5. The process of claim 4 wherein the hydrogen-rich gas is a commercially pure hydrogen of at least 99.5% by volume hydrogen.

6. The process of claim 4 wherein a portion of the recycled gas mixture is combusted as fuel for the reformation reaction.

7. The process of claim 1 wherein the hydrogen-rich gas is separated from the gas mixture initially and the carbon monoxide is separated from the gas mixture thereafter.

8. The process of claim 7 wherein the hydrogen-rich gas is separated from the gas mixture by selective permeation of the hydrogen-rich gas through a membrane preferentially over the other constituents of the gas mixture.

9. The process of claim 7 wherein the hydrogen-rich gas is separated from the gas mixture by selective adsorption of the non-hydrogen gas constituents preferentially over hydrogen, which is recovered relatively unadsorbed in the separation.

10. The process of claim 9 wherein the hydrogen-rich gas is a commercially pure hydrogen of at least 99.5% by volume hydrogen.

11. The process of claim 9 wherein a portion of the recycled gas mixture is combusted as fuel for the reformation reaction.

12. The process of claim 1 wherein the adsorbent for bulk separation of carbon monoxide contains dispersed cuprous ion sufficient to adsorb bulk quantities of carbon monoxide from the gas mixture.

13. The process of claim 12 wherein the copper containing adsorbent is selective for adsorption of carbon monoxide over carbon dioxide and methane.

14. The process of claim 1 wherein carbon dioxide is removed from the gas mixture prior to the removal of carbon monoxide or hydroge-rich gas by selective adsorption of the carbon dioxide on an adsorbent selective for the adsorption of carbon dioxide over hydrogen and carbon monoxide.

15. The process of claim 14 wherein carbon monoxide is separated from the gas mixture after removal of the carbon dioxide and thereafter a hydrogen-rich gas is separated from the gas mixture.

16. The process of claim 15 wherein the hydrogen-rich gas is separated from the gas mixture by the selective permeation of the hydrogen-rich gas through a membrane preferentially over the other constituents of the gas mixture.

17. The process of claim 15 wherein the gas mixture after removal of the hydrogen-rich gas is recycled to the reformation reaction.

18. The process of claim 17 wherein the gas mixture after removal of the hydrogen-rich gas purges carbon dioxide from the adsorbent selective for the adsorption of carbon dioxide before being recycled to the reformation reaction.

19. The process of claim 15 wherein the hydrogen-rich gas is separated from the gas mixture by selective adsorption of the non-hydrogen gas constituents preferentially over hydrogen, which is recovered relatively unadsorbed in the separation.

20. The process of claim 14 wherein a hydrogen-rich gas is separated from the gas mixture after removal of the carbon dioxide and thereafter carbon monoxide is separated from the gas mixture.

21. The process of claim 20 wherein the hydrogen-rich gas is separated from the gas mixture by the selective permeation of the hydrogen-rich gas through a membrane preferentially over the other constituents of the gas mixture.

22. The process of claim 20 wherein the gas mixture after removal of the carbon monoxide is recycled to the reformation reaction.

23. The process of claim 22 wherein the gas mixture after removal of the carbon monoxide purges carbon dioxide from the adsorbent selective for the adsorption of carbon dioxide before being recycled to the reformation reaction.

24. The process of claim 22 wherein the hydrogen-rich gas is separated from the gas mixture by the selective permeation of the hydrogen-rich gas through a membrane preferentially over the other constituents of the gas mixture.

25. The process of claim 20 wherein the hydrogen-rich gas is separated from the gas mixture by selective adsorption of the non-hydrogen gas constituents preferentially over hydrogen, which is recovered relatively unadsorbed in the separation.

26. The process of claim 14 wherein the hydrogen-rich gas is a commercially pure hydrogen of at least 99.5% by volume hydrogen.

27. The process of claim 14 wherein a portion of the recycled gas mixture is combusted as fuel for the reformation reaction.

28. An integrated process for bulk separation and recovery of carbon monoxide and the separate separation and recovery of a hydrogen-rich gas from a gas mixture, additionally containing carbon dioxide, methane and nitrogen, from a reformation reaction of a hydrocarbon feed stream, comprising:

(a) reforming a hydrocarbon feed stream in a reformation reaction into a gas mixture containing at least hydrogen, carbon monoxide, carbon dioxide, methane and nitrogen;

(b) separating and recovering carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture;

(c) separating a hydrogen-rich gas from the gas mixture by selective permeation of the hydrogen-rich gas through a membrane preferentially over the other constituents of the gas mixture; and (d) recycling at least a portion of the gas mixture as a portion of the feed stream to the reformation reaction after the separations of carbon monoxide and hydrogen-rich gas.

29. An integrated process for bulk separation and recovery of carbon monoxide and the separate separation and recovery of hydrogen from a gas mixture, additionally containing carbon dioxide, methane and nitrogen, from a reformation reaction of a hydrocarbon feed stream, comprising:

(a) reforming a hydrocarbon feed stream in a reformation reaction into a gas mixture containing at least hydrogen, carbon monoxide, carbon dioxide, methane and nitrogen;

(b) separating and recovering carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture;

(c) separating hydrogen from the gas mixture by selective adsorption of the non-hydrogen constituents preferentially over hydrogen, which is recovered relatively unadsorbed in the separation;

(d) recycling at least a portion of the gas mixture as a portion of the feed stream to the reformation reaction after the separations of carbon monoxide and hydrogen; and (e) combusting a portion of the recycled gas mixture as fuel for the reformation reaction.

30. An integrated process for bulk separation and recovery of carbon monoxide and the separate separation and recovery of a hydrogen-rich gas from a gas mixture, additionally containing carbon dioxide, methane and nitrogen, from a reformation reaction of a hydrocarbon feed stream, comprising:

(a) reforming a hydrocarbon feed stream in a reformation reaction into a gas mixture containing at least hydrogen, carbon monoxide, carbon dioxide, methane and nitrogen;

(b) separating carbon dioxide from the gas mixture, wherein the carbon dioxide is separated from the gas mixture by selective adsorption of the carbon dioxide on an adsorbent capable of adsorbing carbon dioxide over carbon monoxide and hydrogen from the gas mixture;

(c) separating and recovering carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture;

(d) separating a hydrogen-rich gas from the gas mixture by selective permeation of the hydrogen-rich gas through a membrane preferentially over the other constituents of the gas mixture; and (e) recycling at least a portion of the gas mixture as a portion of the feed stream to the reformation reaction after the separations of carbon monoxide and hydrogen-rich gas.

31. An integrated process for bulk separation and recovery of carbon monoxide and the separate separation and recovery of hydrogen from a gas mixture, additionally containing carbon dioxide, methane and nitrogen, from a reformation reaction of a hydrocarbon feed stream, comprising:

(a) reforming a hydrocarbon feed stream in a reformation reaction into a gas mixture containing at least hydrogen, carbon monoxide, carbon dioxide, methane and nitrogen;

(b) separating carbon dioxide from the gas mixture, wherein the carbon dioxide is separated from the gas mixture by selective adsorption of the carbon dioxide on an adsorbent capable of adsorbing carbon dioxide over carbon monoxide and hydrogen from the gas mixture;

(c) separating and recovering carbon monoxide from the gas mixture, wherein the carbon monoxide is separated from the gas mixture in a single stage and a purity of at least 98 volume percent by selective adsorption of the carbon monoxide on an adsorbent capable of adsorbing bulk quantities of the carbon monoxide from the gas mixture;

(d) separating hydrogen from the gas mixture by selective adsorption of the non-hydrogen constituents preferentially over hydrogen, which is recovered relatively unadsorbed in the separation;

(e) purging carbon dioxide from the adsorbent selective for the adsorption of carbon dioxide using the gas mixture after removal of the hydrogen as the purge gas;

(f) recycling at least a portion of the purge gas as a portion of the feed stream to the reformation reaction after the separations of carbon monoxide and hydrogen; and (g) combusting a portion of the recycled purge gas as fuel for the reformation reaction.

* * * * *